(12) United States Patent
Petrovic et al.

(10) Patent No.: US 8,451,086 B2
(45) Date of Patent: *May 28, 2013

(54) REMOTE CONTROL SIGNALING USING AUDIO WATERMARKS

(75) Inventors: Rade Petrovic, San Diego, CA (US); Joseph M. Winograd, San Diego, CA (US)

(73) Assignee: Verance Corporation, San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/361,260

(22) Filed: Jan. 30, 2012

(65) Prior Publication Data
US 2012/0130719 A1     May 24, 2012

Related U.S. Application Data

(60) Continuation of application No. 12/958,292, filed on Dec. 1, 2010, now Pat. No. 8,106,745, which is a continuation of application No. 11/821,203, filed on Jun. 22, 2007, now Pat. No. 8,106,744, which is a continuation of application No. 10/794,520, filed on Mar. 5, 2004, now abandoned, which is a division of application No. 09/505,080, filed on Feb. 16, 2000, now Pat. No. 6,737,957.

(51) Int. Cl.
| | |
|---|---|
| *G05B 19/00* | (2006.01) |
| *G06F 7/00* | (2006.01) |
| *H04B 1/00* | (2006.01) |
| *H04L 9/14* | (2006.01) |

(52) U.S. Cl.
USPC ...... 340/5.28; 340/5.41; 340/12.5; 340/13.24

(58) Field of Classification Search
USPC ............. 340/5.28, 5.42, 12.5, 13.24; 380/54, 380/201, 203, 44; 726/4, 28; 382/100, 237; 713/176, 178, 179; 283/72
See application file for complete search history.

(56) References Cited

U.S. PATENT DOCUMENTS

| | | | |
|---|---|---|---|
| 3,406,344 | A | 10/1968 | Hopper |
| 3,842,196 | A | 10/1974 | Loughlin |

(Continued)

FOREIGN PATENT DOCUMENTS

| | | |
|---|---|---|
| CA | 2276638 | 1/2000 |
| EP | 282734 | 9/1988 |

(Continued)

OTHER PUBLICATIONS

Boney, et al., Digital Watermarks for Audio Signals, Dept Elect Eng, Univ Minn, Mar. 27, 1996 (4 pages).

(Continued)

*Primary Examiner* — Nam V Nguyen
(74) *Attorney, Agent, or Firm* — Perkins Coie LLP; Donald Wenskay

(57) ABSTRACT

A system for using a watermark embedded in an audio signal to remotely control a device. Various devices such as toys, computers, and appliances, equipped with an appropriate detector, detect the hidden signals, which can trigger an action, or change a state of the device. The watermarks can be used with a "time gate" device, where detection of the watermark opens a time interval within which a user is allowed to perform an action, such as pressing a button, typing in an answer, turning a key in a lock, etc.

30 Claims, 6 Drawing Sheets

U.S. PATENT DOCUMENTS

| | | |
|---|---|---|
| 3,885,217 A | 5/1975 | Cintron |
| 3,894,190 A | 7/1975 | Gassmann |
| 3,919,479 A | 11/1975 | Moon et al. |
| 3,973,206 A | 8/1976 | Haselwood et al. |
| 4,048,562 A | 9/1977 | Haselwood et al. |
| 4,176,379 A | 11/1979 | Wessler et al. |
| 4,199,788 A | 4/1980 | Tsujimura |
| 4,225,967 A | 9/1980 | Miwa et al. |
| 4,230,990 A | 10/1980 | Lert, Jr. et al. |
| 4,281,217 A | 7/1981 | Dolby |
| 4,295,128 A | 10/1981 | Hashemian et al. |
| 4,425,578 A | 1/1984 | Haselwood et al. |
| 4,454,610 A | 6/1984 | Sziklai |
| 4,464,656 A | 8/1984 | Nakamura |
| 4,497,060 A | 1/1985 | Yang |
| 4,512,013 A | 4/1985 | Nash et al. |
| 4,547,804 A | 10/1985 | Greenberg |
| 4,564,862 A | 1/1986 | Cohen |
| 4,593,904 A | 6/1986 | Graves |
| 4,639,779 A | 1/1987 | Greenberg |
| 4,669,089 A | 5/1987 | Gahagan et al. |
| 4,677,466 A | 6/1987 | Lert, Jr. et al. |
| 4,686,707 A | 8/1987 | Iwasaki et al. |
| 4,703,476 A | 10/1987 | Howard |
| 4,706,282 A | 11/1987 | Knowd |
| 4,723,302 A | 2/1988 | Fulmer et al. |
| 4,729,398 A | 3/1988 | Benson et al. |
| 4,739,398 A | 4/1988 | Thomas et al. |
| 4,750,173 A | 6/1988 | Bluthgen |
| 4,755,871 A | 7/1988 | Morales-Garza et al. |
| 4,755,884 A | 7/1988 | Efron et al. |
| 4,764,608 A | 8/1988 | Masuzawa et al. |
| 4,764,808 A | 8/1988 | Solar |
| 4,789,863 A | 12/1988 | Bush |
| 4,805,020 A | 2/1989 | Greenberg |
| 4,807,013 A | 2/1989 | Manocha |
| 4,807,031 A | 2/1989 | Broughton et al. |
| 4,840,602 A | 6/1989 | Rose |
| 4,843,562 A | 6/1989 | Kenyon et al. |
| 4,876,617 A | 10/1989 | Best et al. |
| 4,876,736 A | 10/1989 | Kiewit |
| 4,930,011 A | 5/1990 | Kiewit |
| 4,931,871 A | 6/1990 | Kramer |
| 4,937,807 A | 6/1990 | Weitz et al. |
| 4,939,515 A | 7/1990 | Adelson |
| 4,943,963 A | 7/1990 | Waechter et al. |
| 4,945,412 A | 7/1990 | Kramer |
| 4,967,273 A | 10/1990 | Greenberg |
| 4,969,041 A | 11/1990 | O'Grady et al. |
| 4,972,471 A | 11/1990 | Gross et al. |
| 4,972,503 A | 11/1990 | Zurlinden |
| 4,979,210 A | 12/1990 | Nagata et al. |
| 5,057,915 A | 10/1991 | Von Kohorn ............... 463/9 |
| 5,073,925 A | 12/1991 | Nagata et al. |
| 5,080,479 A | 1/1992 | Rosenberg |
| 5,113,437 A | 5/1992 | Best et al. |
| 5,116,437 A | 5/1992 | Yamamoto et al. |
| 5,161,251 A | 11/1992 | Mankovitz |
| 5,191,615 A | 3/1993 | Aldava et al. |
| 5,200,822 A | 4/1993 | Bronfin et al. |
| 5,210,820 A | 5/1993 | Kenyon |
| 5,210,831 A | 5/1993 | Emma et al. |
| 5,213,337 A | 5/1993 | Sherman |
| 5,214,792 A | 5/1993 | Alwadish |
| 5,237,611 A | 8/1993 | Rasmussen et al. |
| 5,251,041 A | 10/1993 | Young et al. |
| 5,270,480 A | 12/1993 | Hikawa |
| 5,294,962 A | 3/1994 | Sato et al. |
| 5,294,982 A | 3/1994 | Salomon et al. |
| 5,319,453 A | 6/1994 | Copriviza et al. |
| 5,319,735 A | 6/1994 | Preuss et al. |
| 5,351,304 A | 9/1994 | Yamamoto |
| 5,379,345 A | 1/1995 | Greenberg |
| 5,402,488 A | 3/1995 | Karlock |
| 5,404,160 A | 4/1995 | Schober et al. |
| 5,404,377 A | 4/1995 | Moses |
| 5,408,258 A | 4/1995 | Kolessar |
| 5,414,729 A | 5/1995 | Fenton |
| 5,424,785 A | 6/1995 | Orphan |
| 5,425,100 A | 6/1995 | Thomas et al. |
| 5,432,799 A | 7/1995 | Shimpuku et al. |
| 5,436,653 A | 7/1995 | Ellis et al. |
| 5,450,490 A | 9/1995 | Jensen et al. |
| 5,452,901 A | 9/1995 | Nakada et al. ............... 446/454 |
| 5,473,631 A | 12/1995 | Moses |
| 5,481,294 A | 1/1996 | Thomas et al. |
| 5,497,372 A | 3/1996 | Nankoh et al. |
| 5,502,576 A | 3/1996 | Ramsay et al. |
| 5,504,518 A | 4/1996 | Ellis et al. |
| 5,508,754 A | 4/1996 | Orphan |
| 5,519,454 A | 5/1996 | Willis |
| 5,526,427 A | 6/1996 | Thomas et al. |
| 5,537,484 A | 7/1996 | Kobayashi |
| 5,579,124 A | 11/1996 | Aijala et al. |
| 5,581,658 A | 12/1996 | O'Hagan et al. |
| 5,581,800 A | 12/1996 | Fardeau et al. |
| 5,592,553 A | 1/1997 | Guski et al. ............... 713/159 |
| 5,612,729 A | 3/1997 | Ellis et al. |
| 5,613,004 A | 3/1997 | Cooperman et al. |
| 5,636,292 A | 6/1997 | Rhoads |
| 5,664,018 A | 9/1997 | Leighton |
| 5,687,191 A | 11/1997 | Lee et al. |
| 5,687,236 A | 11/1997 | Moskowitz et al. |
| 5,699,427 A | 12/1997 | Chow et al. |
| 5,719,619 A | 2/1998 | Hattori et al. |
| 5,719,937 A | 2/1998 | Warren et al. |
| 5,737,329 A | 4/1998 | Horiguchi |
| 5,752,880 A | 5/1998 | Gabai et al. |
| 5,761,606 A | 6/1998 | Wolzien |
| 5,764,763 A | 6/1998 | Jensen et al. |
| 5,778,108 A | 7/1998 | Coleman, Jr. |
| 5,787,334 A | 7/1998 | Fardeau et al. |
| 5,805,635 A | 9/1998 | Andrews, Jr. et al. |
| 5,809,064 A | 9/1998 | Fenton et al. |
| 5,819,289 A | 10/1998 | Sanford, II et al. |
| 5,822,360 A | 10/1998 | Lee |
| 5,822,432 A | 10/1998 | Moskowitz et al. |
| 5,825,892 A | 10/1998 | Braudaway et al. |
| 5,828,325 A | 10/1998 | Wolosewicz et al. |
| 5,832,119 A | 11/1998 | Rhoads |
| 5,841,978 A | 11/1998 | Rhoads |
| 5,848,155 A | 12/1998 | Cox |
| 5,850,249 A | 12/1998 | Massetti et al. |
| 5,850,481 A | 12/1998 | Rhoads |
| 5,862,260 A | 1/1999 | Rhoads |
| 5,887,243 A | 3/1999 | Harvey et al. |
| 5,889,868 A | 3/1999 | Moskowitz et al. |
| 5,892,900 A | 4/1999 | Ginter et al. |
| 5,893,067 A | 4/1999 | Bender et al. |
| 5,901,178 A | 5/1999 | Lee et al. |
| 5,905,800 A | 5/1999 | Moskowitz et al. |
| 5,930,369 A | 7/1999 | Cox et al. |
| 5,933,798 A | 8/1999 | Linnartz |
| 5,937,000 A | 8/1999 | Lee et al. |
| 5,940,124 A | 8/1999 | Janko et al. |
| 5,940,134 A | 8/1999 | Wirtz |
| 5,940,135 A | 8/1999 | Petrovic et al. |
| 5,940,429 A | 8/1999 | Lam et al. |
| 5,943,422 A | 8/1999 | Van Wie et al. |
| 5,945,932 A | 8/1999 | Smith et al. |
| 5,949,885 A | 9/1999 | Leighton |
| 5,960,081 A | 9/1999 | Vynne et al. |
| 5,963,909 A | 10/1999 | Warren et al. |
| 5,986,692 A | 11/1999 | Logan et al. |
| 6,021,432 A | 2/2000 | Sizer, II et al. |
| 6,031,914 A | 2/2000 | Tewfik et al. ............... 380/54 |
| 6,035,171 A | 3/2000 | Takaya et al. |
| 6,035,177 A | 3/2000 | Moses et al. |
| 6,044,156 A | 3/2000 | Honsinger et al. |
| 6,061,793 A | 5/2000 | Tewfik et al. |
| 6,067,440 A | 5/2000 | Diefes |
| 6,078,664 A | 6/2000 | Moskowitz et al. |
| 6,094,228 A | 7/2000 | Ciardull et al. |
| 6,101,310 A | 8/2000 | Terada et al. |
| 6,128,597 A | 10/2000 | Kolluru et al. |
| 6,145,081 A | 11/2000 | Winograd et al. |
| 6,154,571 A | 11/2000 | Cox et al. ............... 382/250 |

| | | | |
|---|---|---|---|
| 6,160,986 A | 12/2000 | Gabai et al. ............... 434/308 | |
| 6,173,271 B1 | 1/2001 | Goodman et al. | |
| 6,175,627 B1 | 1/2001 | Petrovic et al. | |
| 6,189,123 B1 | 2/2001 | Anders Nystrom et al. | |
| 6,209,092 B1 | 3/2001 | Linnartz | |
| 6,209,094 B1 | 3/2001 | Levine et al. ............... 713/176 | |
| 6,222,932 B1 | 4/2001 | Rao et al. | |
| 6,229,572 B1 | 5/2001 | Ciardullo et al. | |
| 6,233,347 B1 | 5/2001 | Chen et al. | |
| 6,246,775 B1 | 6/2001 | Nakamura et al. | |
| 6,246,802 B1 | 6/2001 | Fujihara et al. | |
| 6,249,870 B1 | 6/2001 | Kobayashi et al. | |
| 6,252,972 B1 | 6/2001 | Linnartz | |
| 6,253,113 B1 | 6/2001 | Lu | |
| 6,253,189 B1 | 6/2001 | Feezell et al. | |
| 6,268,866 B1 | 7/2001 | Shibata | |
| 6,278,792 B1 | 8/2001 | Cox et al. | |
| 6,282,299 B1 | 8/2001 | Tewfik et al. | |
| 6,285,774 B1 | 9/2001 | Schumann et al. | |
| 6,289,108 B1 | 9/2001 | Rhoads | |
| 6,290,566 B1 * | 9/2001 | Gabai et al. ............... 446/175 | |
| 6,330,335 B1 | 12/2001 | Rhoads | |
| 6,330,672 B1 | 12/2001 | Shur | |
| 6,332,031 B1 | 12/2001 | Rhoads et al. | |
| 6,332,194 B1 | 12/2001 | Bloom et al. | |
| 6,353,672 B1 | 3/2002 | Rhoads | |
| 6,363,159 B1 | 3/2002 | Rhoads | |
| 6,373,974 B2 | 4/2002 | Zeng | |
| 6,374,036 B1 | 4/2002 | Ryan et al. | |
| 6,381,341 B1 | 4/2002 | Rhoads | |
| 6,385,330 B1 | 5/2002 | Powell et al. | |
| 6,388,712 B1 | 5/2002 | Shinohara et al. | |
| 6,389,152 B2 | 5/2002 | Nakamura et al. | |
| 6,389,538 B1 | 5/2002 | Gruse et al. | |
| 6,400,826 B1 | 6/2002 | Chen et al. | |
| 6,400,827 B1 | 6/2002 | Rhoads | |
| 6,404,781 B1 | 6/2002 | Kawamae et al. | |
| 6,404,898 B1 | 6/2002 | Rhoads | |
| 6,411,725 B1 | 6/2002 | Rhoads ............... 382/100 | |
| 6,415,040 B1 | 7/2002 | Linnartz et al. | |
| 6,415,041 B1 | 7/2002 | Oami et al. | |
| 6,424,726 B2 | 7/2002 | Nakano et al. | |
| 6,427,012 B1 | 7/2002 | Petrovic | |
| 6,430,301 B1 | 8/2002 | Petrovic | |
| 6,430,302 B2 | 8/2002 | Rhoads | |
| 6,449,367 B2 | 9/2002 | Van Wie et al. | |
| 6,449,496 B1 | 9/2002 | Beith et al. ............... 455/563 | |
| 6,473,560 B1 | 10/2002 | Linnartz et al. | |
| 6,477,431 B1 | 11/2002 | Kalker et al. | |
| 6,487,301 B1 | 11/2002 | Zhao | |
| 6,490,355 B1 | 12/2002 | Epstein ............... 380/203 | |
| 6,496,591 B1 | 12/2002 | Rhoads | |
| 6,505,160 B1 | 1/2003 | Levy et al. | |
| 6,510,233 B1 | 1/2003 | Nakano | |
| 6,510,234 B1 | 1/2003 | Cox et al. | |
| 6,512,837 B1 | 1/2003 | Ahmed | |
| 6,523,113 B1 | 2/2003 | Wehrenberg | |
| 6,529,506 B1 | 3/2003 | Yamamoto et al. | |
| 6,530,021 B1 | 3/2003 | Epstein et al. | |
| 6,550,011 B1 | 4/2003 | Sims, III | |
| 6,553,127 B1 | 4/2003 | Kurowski | |
| 6,556,688 B1 | 4/2003 | Ratnakar | |
| 6,557,103 B1 | 4/2003 | Boncelet, Jr. et al. | |
| 6,570,996 B1 | 5/2003 | Linnartz | |
| 6,571,144 B1 | 5/2003 | Moses et al. ............... 700/94 | |
| 6,574,350 B1 | 6/2003 | Rhoads et al. | |
| 6,577,744 B1 | 6/2003 | Braudaway et al. | |
| 6,584,138 B1 | 6/2003 | Neubauer et al. | |
| 6,590,996 B1 * | 7/2003 | Reed et al. ............... 382/100 | |
| 6,590,997 B2 | 7/2003 | Rhoads | |
| 6,591,365 B1 | 7/2003 | Cookson | |
| 6,592,516 B2 | 7/2003 | Lee ............... 600/38 | |
| 6,598,162 B1 | 7/2003 | Moskowitz | |
| 6,614,914 B1 | 9/2003 | Rhoads et al. | |
| 6,618,484 B1 | 9/2003 | Van Wie et al. | |
| 6,625,297 B1 | 9/2003 | Bradley | |
| 6,633,653 B1 | 10/2003 | Hobson et al. | |
| 6,636,615 B1 | 10/2003 | Rhoads et al. | |
| 6,647,128 B1 | 11/2003 | Rhoads | |
| 6,647,129 B2 | 11/2003 | Rhoads | |
| 6,654,501 B1 | 11/2003 | Acharya et al. | |
| 6,661,905 B1 | 12/2003 | Chupp et al. | |
| 6,665,419 B1 | 12/2003 | Oami | |
| 6,668,068 B2 | 12/2003 | Hashimoto | |
| 6,671,376 B1 | 12/2003 | Koto et al. | |
| 6,671,388 B1 | 12/2003 | Op De Beeck et al. | |
| 6,674,861 B1 | 1/2004 | Xu et al. | |
| 6,674,876 B1 | 1/2004 | Hannigan et al. | |
| 6,675,146 B2 | 1/2004 | Rhoads | |
| 6,678,389 B1 | 1/2004 | Sun et al. | |
| 6,681,029 B1 | 1/2004 | Rhoads | |
| 6,683,958 B2 | 1/2004 | Petrovic | |
| 6,697,944 B1 | 2/2004 | Jones et al. | |
| 6,700,990 B1 | 3/2004 | Rhoads | |
| 6,704,431 B1 | 3/2004 | Ogawa et al. | |
| 6,707,926 B1 | 3/2004 | Macy et al. | |
| 6,728,390 B2 | 4/2004 | Rhoads et al. | |
| 6,737,957 B1 | 5/2004 | Petrovic et al. | |
| 6,738,495 B2 | 5/2004 | Rhoads et al. | |
| 6,744,906 B2 | 6/2004 | Rhoads et al. | |
| 6,748,360 B2 | 6/2004 | Pitman et al. | |
| 6,751,337 B2 | 6/2004 | Tewfik et al. | |
| 6,757,908 B1 | 6/2004 | Vogel | |
| 6,768,807 B1 | 7/2004 | Muratani | |
| 6,771,797 B2 | 8/2004 | Ahmed | |
| 6,785,399 B2 * | 8/2004 | Fujihara ............... 382/100 | |
| 6,785,401 B2 | 8/2004 | Walker et al. | |
| 6,785,815 B1 | 8/2004 | Serret-Avila et al. | |
| 6,792,542 B1 | 9/2004 | Lee et al. | |
| 6,798,893 B1 | 9/2004 | Tanaka | |
| 6,829,368 B2 | 12/2004 | Meyer et al. | |
| 6,834,344 B1 | 12/2004 | Aggarwal et al. | |
| 6,834,345 B2 | 12/2004 | Bloom et al. | |
| 6,850,626 B2 | 2/2005 | Rhoads et al. | |
| 6,856,693 B2 | 2/2005 | Miller | |
| 6,880,082 B2 | 4/2005 | Ohta | |
| 6,888,943 B1 | 5/2005 | Lam et al. | |
| 6,891,958 B2 | 5/2005 | Kirovski et al. | |
| 6,912,010 B2 | 6/2005 | Baker et al. | |
| 6,912,294 B2 | 6/2005 | Wang et al. | |
| 6,912,315 B1 | 6/2005 | Wong et al. | |
| 6,915,002 B2 | 7/2005 | Gustafson | |
| 6,915,422 B1 | 7/2005 | Nakamura | |
| 6,915,481 B1 | 7/2005 | Tewfik et al. | |
| 6,931,536 B2 | 8/2005 | Hollar | |
| 6,944,313 B1 | 9/2005 | Donescu | |
| 6,947,893 B1 * | 9/2005 | Iwaki et al. ............... 704/258 | |
| 6,952,774 B1 | 10/2005 | Kirovski et al. | |
| 6,954,541 B2 | 10/2005 | Fan et al. | |
| 6,961,854 B2 | 11/2005 | Serret-Avila et al. | |
| 6,973,195 B1 | 12/2005 | Matsui | |
| 6,993,154 B2 | 1/2006 | Brunk | |
| 6,996,249 B2 | 2/2006 | Miller et al. | |
| 7,007,166 B1 | 2/2006 | Moskowitz et al. | |
| 7,020,304 B2 | 3/2006 | Alattar et al. | |
| 7,024,018 B2 | 4/2006 | Petrovic | |
| 7,043,049 B2 | 5/2006 | Kuzma | |
| 7,043,536 B1 | 5/2006 | Philyaw et al. | |
| 7,046,808 B1 | 5/2006 | Metois et al. | |
| 7,054,461 B2 | 5/2006 | Zeller et al. | |
| 7,054,462 B2 | 5/2006 | Rhoads et al. | |
| 7,058,815 B2 | 6/2006 | Morin | |
| 7,068,809 B2 | 6/2006 | Stach | |
| 7,072,492 B2 | 7/2006 | Ogawa et al. | |
| 7,142,691 B2 | 11/2006 | Levy | |
| 7,162,642 B2 | 1/2007 | Schumann et al. | |
| 7,164,778 B1 | 1/2007 | Nakamura et al. ............ 382/100 | |
| 7,171,020 B2 | 1/2007 | Rhoads et al. | |
| 7,177,429 B2 | 2/2007 | Moskowitz et al. | |
| 7,197,368 B2 | 3/2007 | Kirovski et al. | |
| 7,206,649 B2 | 4/2007 | Kirovski et al. | |
| 7,231,061 B2 | 6/2007 | Bradley | |
| 7,289,643 B2 | 10/2007 | Brunk et al. | |
| 7,298,865 B2 | 11/2007 | Lubin et al. | |
| 7,319,759 B1 | 1/2008 | Peinado et al. | |
| 7,321,666 B2 | 1/2008 | Kunisa | |
| 7,334,247 B1 | 2/2008 | Finseth et al. | |
| 7,336,802 B2 | 2/2008 | Kunisa | |

| | | |
|---|---|---|
| 7,346,514 B2 | 3/2008 | Herre et al. |
| 7,369,677 B2 | 5/2008 | Petrovic et al. |
| 7,389,421 B2 | 6/2008 | Kirovski et al. |
| 7,450,727 B2 | 11/2008 | Griesinger |
| 7,454,019 B2 | 11/2008 | Williams |
| 7,581,103 B2 | 8/2009 | Home et al. |
| 7,616,776 B2 | 11/2009 | Petrovic et al. |
| 7,630,497 B2 | 12/2009 | Lotspiech et al. |
| 7,644,282 B2 | 1/2010 | Petrovic et al. |
| 7,660,991 B2 | 2/2010 | Nakamura et al. |
| 7,664,332 B2 | 2/2010 | Wong et al. |
| 7,693,297 B2 | 4/2010 | Zhang et al. |
| 7,788,684 B2 | 8/2010 | Petrovic et al. |
| 7,840,006 B2 | 11/2010 | Ogawa et al. |
| 7,983,922 B2 | 7/2011 | Neusinger et al. |
| 7,986,806 B2 | 7/2011 | Rhoads |
| 8,059,815 B2 | 11/2011 | Lofgren et al. |
| 8,155,463 B2 | 4/2012 | Wong et al. |
| 2001/0001159 A1 | 5/2001 | Ford |
| 2001/0021926 A1 | 9/2001 | Schneck et al. |
| 2001/0022786 A1 | 9/2001 | King et al. |
| 2001/0044899 A1 | 11/2001 | Levy |
| 2002/0007403 A1 | 1/2002 | Echizen et al. |
| 2002/0012443 A1 | 1/2002 | Rhoads et al. |
| 2002/0033844 A1 | 3/2002 | Levy et al. |
| 2002/0044659 A1 | 4/2002 | Ohta |
| 2002/0052885 A1 | 5/2002 | Levy |
| 2002/0053026 A1 | 5/2002 | Hashimoto |
| 2002/0054089 A1 | 5/2002 | Nicholas et al. |
| 2002/0080964 A1 | 6/2002 | Stone et al. |
| 2002/0080976 A1 | 6/2002 | Schreer |
| 2002/0082731 A1 | 6/2002 | Pitman et al. |
| 2002/0095577 A1 | 7/2002 | Nakamura et al. |
| 2002/0097873 A1 | 7/2002 | Petrovic |
| 2002/0120849 A1 | 8/2002 | McKinley et al. |
| 2002/0120854 A1 | 8/2002 | LeVine et al. |
| 2002/0126842 A1 | 9/2002 | Hollar |
| 2002/0126872 A1 | 9/2002 | Brunk et al. |
| 2002/0138734 A1 | 9/2002 | David et al. |
| 2002/0154144 A1 | 10/2002 | Lofgren et al. |
| 2002/0168087 A1 | 11/2002 | Petrovic |
| 2002/0178368 A1 | 11/2002 | Yin et al. |
| 2003/0009671 A1 | 1/2003 | Yacobi et al. |
| 2003/0012403 A1 | 1/2003 | Rhoads et al. |
| 2003/0021439 A1 | 1/2003 | Lubin et al. |
| 2003/0021441 A1 | 1/2003 | Levy et al. |
| 2003/0028796 A1 | 2/2003 | Roberts et al. |
| 2003/0031317 A1 | 2/2003 | Epstein |
| 2003/0033321 A1 | 2/2003 | Schrempp et al. |
| 2003/0037075 A1 | 2/2003 | Hannigan et al. |
| 2003/0053655 A1 | 3/2003 | Barone et al. |
| 2003/0061489 A1 | 3/2003 | Pelly et al. |
| 2003/0063747 A1 | 4/2003 | Petrovic |
| 2003/0076955 A1 | 4/2003 | Alve et al. |
| 2003/0081809 A1 | 5/2003 | Fridrich et al. |
| 2003/0112974 A1 | 6/2003 | Levy |
| 2003/0115504 A1 | 6/2003 | Holliman et al. |
| 2003/0131350 A1 | 7/2003 | Peiffer et al. |
| 2003/0152225 A1 | 8/2003 | Kunisa |
| 2003/0177359 A1 | 9/2003 | Bradley |
| 2003/0179901 A1 | 9/2003 | Tian et al. |
| 2003/0185417 A1 | 10/2003 | Alattar et al. |
| 2003/0187679 A1 | 10/2003 | Odgers et al. |
| 2003/0188166 A1 | 10/2003 | Pelly et al. |
| 2003/0190054 A1 | 10/2003 | Troyansky et al. |
| 2003/0190055 A1 | 10/2003 | Kalker et al. |
| 2003/0200438 A1 | 10/2003 | Kirovski et al. |
| 2003/0223584 A1 | 12/2003 | Bradley et al. |
| 2004/0005076 A1 | 1/2004 | Hosaka et al. |
| 2004/0008864 A1 | 1/2004 | Watson et al. |
| 2004/0009763 A1 | 1/2004 | Stone et al. |
| 2004/0010692 A1 | 1/2004 | Watson |
| 2004/0015400 A1 | 1/2004 | Whymark |
| 2004/0025176 A1 | 2/2004 | Franklin et al. |
| 2004/0028255 A1 | 2/2004 | Miller |
| 2004/0042635 A1 | 3/2004 | Epstein et al. |
| 2004/0042636 A1 | 3/2004 | Oh |
| 2004/0073916 A1 | 4/2004 | Petrovic et al. |
| 2004/0078575 A1 | 4/2004 | Morten et al. |
| 2004/0088556 A1 | 5/2004 | Weirauch |
| 2004/0091111 A1 | 5/2004 | Levy et al. |
| 2004/0093523 A1 | 5/2004 | Matsuzaki et al. |
| 2004/0098593 A1 | 5/2004 | Muratani |
| 2004/0101160 A1 | 5/2004 | Kunisa |
| 2004/0103293 A1 | 5/2004 | Ryan |
| 2004/0133794 A1 | 7/2004 | Kocher et al. |
| 2004/0151316 A1 | 8/2004 | Petrovic |
| 2004/0169581 A1 | 9/2004 | Petrovic et al. |
| 2004/0204943 A1 | 10/2004 | Kirovski et al. |
| 2004/0216157 A1 | 10/2004 | Shain et al. |
| 2005/0008190 A1 | 1/2005 | Levy et al. |
| 2005/0013462 A1 | 1/2005 | Rhoads |
| 2005/0050332 A1 | 3/2005 | Serret-Avila et al. |
| 2005/0120220 A1 | 6/2005 | Oostveen et al. |
| 2005/0196051 A1 | 9/2005 | Wong et al. |
| 2005/0202781 A1 | 9/2005 | Steelberg et al. |
| 2005/0251683 A1 | 11/2005 | Levy et al. |
| 2006/0005029 A1 | 1/2006 | Petrovic et al. |
| 2006/0062426 A1 | 3/2006 | Levy et al. |
| 2006/0227968 A1 | 10/2006 | Chen et al. |
| 2006/0239501 A1 | 10/2006 | Petrovic et al. |
| 2007/0005500 A1 | 1/2007 | Steeves et al. |
| 2007/0039018 A1 | 2/2007 | Saslow et al. |
| 2007/0110237 A1 | 5/2007 | Tehranchi et al. |
| 2007/0143617 A1 | 6/2007 | Farber et al. |
| 2007/0150418 A1 | 6/2007 | Ben-Menahem et al. |
| 2007/0192261 A1 | 8/2007 | Kelkar et al. |
| 2007/0223708 A1 | 9/2007 | Villemoes et al. |
| 2008/0002854 A1 | 1/2008 | Tehranchi et al. |
| 2008/0031463 A1 | 2/2008 | Davis |
| 2008/0310629 A1 | 12/2008 | Van Der Veen et al. |
| 2008/0313741 A1 | 12/2008 | Alve et al. |
| 2009/0031134 A1 | 1/2009 | Levy |
| 2009/0172405 A1 | 7/2009 | Shiomi et al. |
| 2009/0326961 A1 | 12/2009 | Petrovic et al. |
| 2010/0034513 A1 | 2/2010 | Nakano et al. |
| 2010/0146286 A1 | 6/2010 | Petrovic et al. |
| 2010/0226525 A1 | 9/2010 | Levy et al. |
| 2010/0228857 A1 | 9/2010 | Petrovic et al. |
| 2010/0287579 A1 | 11/2010 | Petrovic et al. |
| 2010/0287609 A1 | 11/2010 | Gonzalez et al. |
| 2011/0016172 A1 | 1/2011 | Shah |
| 2011/0202687 A1 | 8/2011 | Glitsch et al. |
| 2011/0209191 A1 | 8/2011 | Shah |
| 2011/0219229 A1 | 9/2011 | Cholas et al. |
| 2011/0225427 A1 | 9/2011 | Wood et al. |
| 2011/0286625 A1 | 11/2011 | Petrovic et al. |
| 2011/0293090 A1 | 12/2011 | Ayaki et al. |
| 2011/0311056 A1 | 12/2011 | Winograd |
| 2012/0017091 A1 | 1/2012 | Petrovic et al. |
| 2012/0026393 A1 | 2/2012 | Petrovic et al. |
| 2012/0072729 A1 | 3/2012 | Winograd et al. |
| 2012/0072730 A1 | 3/2012 | Winograd et al. |
| 2012/0072731 A1 | 3/2012 | Winograd et al. |
| 2012/0084870 A1 | 4/2012 | Petrovic |
| 2012/0300977 A1 | 11/2012 | Petrovic et al. |
| 2013/0007462 A1 | 1/2013 | Petrovic et al. |
| 2013/0011006 A1 | 1/2013 | Petrovic et al. |

FOREIGN PATENT DOCUMENTS

| | | |
|---|---|---|
| EP | 372601 | 6/1990 |
| EP | 581317 | 2/1994 |
| EP | 1137250 | 9/2001 |
| GB | 2260246 | 4/1993 |
| GB | 2292506 | 2/1996 |
| GB | 2363027 | 12/2001 |
| JP | 10-150548 | 6/1998 |
| JP | 11-086435 | 3/1999 |
| JP | 11-284516 | 10/1999 |
| JP | 11-346302 | 12/1999 |
| JP | 2000-069273 | 3/2000 |
| JP | 2000083159 | 3/2000 |
| JP | 2000-174628 | 6/2000 |
| JP | 2000163870 | 6/2000 |
| JP | 2000216981 | 8/2000 |
| JP | 2001022366 | 1/2001 |
| JP | 2001-119555 | 4/2001 |
| JP | 2001175270 | 6/2001 |

| | | |
|---|---|---|
| JP | 2001-188549 | 7/2001 |
| JP | 2001-216763 | 8/2001 |
| JP | 2001-218006 | 8/2001 |
| JP | 2001245132 | 9/2001 |
| JP | 2001-312570 | 11/2001 |
| JP | 2001-527660 | 12/2001 |
| JP | 2002-010057 | 1/2002 |
| JP | 2002-024095 | 1/2002 |
| JP | 2002-027223 | 1/2002 |
| JP | 2002-091465 | 3/2002 |
| JP | 2002091712 A | 3/2002 |
| JP | 2002135557 A | 5/2002 |
| JP | 2002-165191 A | 6/2002 |
| JP | 2002176614 A | 6/2002 |
| JP | 2002-519916 A | 7/2002 |
| JP | 2002-232693 A | 8/2002 |
| JP | 2002232412 A | 8/2002 |
| JP | 2002319924 A | 10/2002 |
| JP | 2002354232 A | 12/2002 |
| JP | 2003-008873 A | 1/2003 |
| JP | 2003-039770 A | 2/2003 |
| JP | 2003-091927 A | 3/2003 |
| JP | 2003-230095 A | 8/2003 |
| JP | 2003-244419 A | 8/2003 |
| JP | 2003-283802 A | 10/2003 |
| JP | 2003316556 A | 11/2003 |
| JP | 2004-023786 A | 1/2004 |
| JP | 2004070606 A | 3/2004 |
| JP | 2004-163855 A | 6/2004 |
| JP | 2004173237 A | 6/2004 |
| JP | 2004-193843 A | 7/2004 |
| JP | 2004194233 A | 7/2004 |
| JP | 2004-328747 A | 11/2004 |
| JP | 2005051733 A | 2/2005 |
| JP | 2005-094107 A | 4/2005 |
| JP | 2005525600 A | 8/2005 |
| WO | 94-10771 | 5/1994 |
| WO | 95-14289 | 5/1995 |
| WO | 97-09797 | 3/1997 |
| WO | 97-33391 | 9/1997 |
| WO | 98-53565 | 11/1998 |
| WO | 99-03340 | 1/1999 |
| WO | 99-39344 | 5/1999 |
| WO | 99-45706 | 10/1999 |
| WO | 99-62022 | 12/1999 |
| WO | 00-00969 | 1/2000 |
| WO | 00-13136 | 3/2000 |
| WO | 00-56059 | 9/2000 |
| WO | 01-54035 | 7/2001 |
| WO | 01-55889 | 8/2001 |
| WO | 0197128 | 12/2001 |
| WO | 0219589 | 3/2002 |
| WO | 0223883 | 3/2002 |
| WO | 0249363 | 6/2002 |
| WO | 02095727 | 11/2002 |
| WO | 03052598 A1 | 6/2003 |
| WO | 2005-027501 | 3/2005 |
| WO | 2005038778 A1 | 4/2005 |
| WO | 2006051043 A1 | 5/2006 |
| WO | 2006116394 A2 | 11/2006 |
| WO | 2010073236 A1 | 7/2010 |

OTHER PUBLICATIONS

Lacy, et al, Information Hiding, (1998), LNCS 1525:158-168.
US Office Action dated Feb. 14, 2011 in U.S. Appl. No. 11/821,203.
US Office Action dated Aug. 18, 2010 in U.S. Appl. No. 11/821,203.
Xu, et al, J Audio Eng Society, (1999), 47(10):805-811.
"Advanced Access Content System (AACS), Pre-recorded Video Book," Revision 0.951, Sep. 2009 (86 pages).
"Content Protection—Self Protecting Digital Content," http://www.cryptography.com/technology/spdc/index.html, May 2010 (1 page).
"Microsoft response to CfP for technology solutions to screen digital audio content for LCM acceptance," Microsoft Corporation, May 23, 1999 (9 pages).
"Task AC122-copy protection for distribution services," Http://acad.bg/WISE/english/rd/partners/acts/areal/ac122-t.html, Jul. 1, 1997 (2 pages).

Adelsbach, A., et al., "Proving Ownership of Digital Content," Proc. 3rd Int. Workshop on Information Hiding, 1768:117-133, Sep. 1999.
Aggarwal, A., et al., "Multi-Layer Grid Embeddings," Foundations of Computer Science, 26th Annual Symposium on Foundations of Computer Science, 85:186-196, Oct. 1985.
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Barreto, P.S.L.M., et al. "Toward Secure Public-Key Blockwise Fragile Authentication Watermarking," IEEE Proceedings Vision, Image, and Signal Processing, 149(2):57-62, Apr. 2002.
Cappellini, V., et al. "Robust Frame-based Watermarking for Digital Video," Proceedings of the 12th International Workshop on Database and Expert Systems Applications, Sep. 2001 (5 pages).
Caronni, G., "Assuring Ownership Rights for Digital Images," Proceedings of reliable IT systems VIS 95, Vieweg Publishing Company, Germany, 1995 (10 pages).
Chen, B., et al., "Quantization index modulation: a class of provably good methods for digital watermarking and information embedding," IEEE Transactions on Information Theory, 47(4):1423-1443 May 2001.
Chou, J., et al., "A Robust Blind Watermarking Scheme based on Distributed Source Coding Principles," Multimedial 2000 Proceedings of the eighth ACM international conference on multimedia, Los Angeles, California, 2000 (8 pages).
Chou, J., et al., "A Robust Optimization Solution to the Data Hiding Problem using Distributed Source Coding Principles," Pro. SPIE, 3971, San Jose, California, Jan. 2000 (10 pages).
Cinea, Inc., "Forensic watermarking deterring video piracy," 2004, (9 pages). [http://www.cinea.com/whitepapers/forensic_watermarking.pdf].
Costa, M., "Writing on Dirty Paper," IEEE Trans. on Info. Theory, 29(3):439-441, May 1983.
Cox, I. J., et al., "Some general methods for tampering with watermarks," IEEE Journal on Selected Areas in Communications, 16(4): 587-593, May 1998.
Coxford, A., et al., "Advanced Mathematics: A Preparation for Calculus, Second Edition," Harcourt Brace Jovanovish, Inc., 1978 (14 pages).
Das, et al., "Distributed Priority Queues on Hybercube Architectures," IEEE, 1996, pp. 620-627.
Davidson, M.F., "Music File Filter," Sony Music, New York, May 23, 1999 (2 pages).
Digimarc Corporation, "Digimarc Watermarking Guide," 1999 (22 pages).
Dittmann, J., "Combining digital watermarks and collusion secure fingerprints for customer copy monitoring," Proc. IEEE Seminar on Secure Images and Image Authentication, Apr. 2000 (6 pages).
Dittmann, J., et al., "Combining digital watermarks and collusion secure fingerprints for digital images," Proc. SPIE 3657:171-182, Jan. 1999 (12 pages).
Epp, L.W., et al., "Generalized scattering matrices for unit cell characterization of grid amplifiers and device de-embedding," IEEE, 2:1288-1291, Jun. 1995.
European Search Report dated Apr. 12, 2012 for European Patent Application No. 07836262.1 filed Jul. 25, 2007 (12 pages).
European Search Report dated Jul. 3, 2012 for European Patent Application No. 12150742.0, filed Oct. 7, 2003 (5 pages).
European Search Report dated Nov. 10, 2010 for European Patent Application No. 03774648.4, filed Oct. 7, 2003 (5 pages).
European Search Report dated Oct. 24, 2012 for European Patent Application No. 06758537.2, filed Apr. 21, 2006 (6 pages).
European Search Report dated Oct. 31, 2012 for European Patent Application No. 06758577.8, filed Apr. 25, 2006 (6 pages).
Furon, T., et al., "An asymmetric watermarking method," IEEE Trans. Signal Processing, 4(51):981-995, Apr. 2003.
Guth, H.J., et al., "Error-and collusion-secure fingerprinting for digital data," Proc. 3rd Int. Workshop on Information Hiding, LNCS 1768:134-145, Sep./Oct. 1999.

Hartung, F., et al., "Digital watermarking of MPEG-2 coded video in the bitstream domain," Proc. IEEE Int. Conf. on Acoustics, Speech and Signal Processing, 4:2621-2624, Apr. 1997.

Hartung, F., et al., "Watermarking of MPEG-2 encoded video without decoding and re-coding," Proc. SPIE Multimedia Computing and Networking 97, 3020:264-274, Feb. 1997.

Hartung, F., et al., "Watermarking of uncompressed and compressed video," Signal Processing, 3(66):283-301, May 1998.

Heegard, C., et al., "On the capacity of computer memory with defects," IEEE Trans. Info. Theory, 5(IT-29):731-739, Sep. 1983.

International Search Report and Written Opinion dated Apr. 24, 2012 for International Application No. PCT/US2011/051857, filed Sep. 15, 2011 (9 pages).

International Search Report and Written Opinion dated Aug. 14, 1998 for International Application No. PCT/US1998/009587, filed May 12, 1998 (3 pages).

International Search Report and Written Opinion dated Aug. 22, 2007 for International Application No. PCT/US2006/031267, filed Aug. 9, 2006 (2 pages).

International Search Report and Written Opinion dated Feb. 14, 2002 for International Application No. PCT/US2001/026505, filed Aug. 27, 2001 (2 pages).

International Search Report and Written Opinion dated Jan. 4, 2008 for International Application No. PCT/US2006/015615, filed Apr. 25, 2006 (5 pages).

International Search Report and Written Opinion dated Mar. 28, 2012 for International Application No. PCT/US2011/051855, filed Sep. 15, 2011 (8 pages).

International Search Report and Written Opinion dated May 13, 2008 for International Application No. PCT/US2006/025090, filed Jun. 27, 2006 (2 pages).

International Search Report and Written Opinion dated May 19, 2004 for International Application No. PCT/US2003/031816, filed Apr. 29, 2004 (3 pages).

International Search Report and Written Opinion dated May 29, 2008 for International Application No. PCT/US2006/015410, filed Apr. 21, 2006 (6 pages).

International Search Report and Written Opinion dated Sep. 26, 2008 for International Application No. PCT/US2007/016812, filed Jul. 25, 2007 (6 pages).

Jacobsmeyer, J., et al., "Introduction to error-control coding," Pericle Communications Company, 2004 (16 pages).

Kalker, T., et al., "A security risk for publicly available watermark detectors," Proc. Benelux Info. Theory Symp., Veldhoven, The Netherlands, May 1998 (7 pages).

Kalker, T., et al., "System issues in digital image and video watermarking for copy protection," Proc. IEEE Int. Conf. on Multimedia Computing and Systems, pp. 562-567, Jun. 1999.

Kang, X., et al., "A DWT-DFT composite watermarking scheme robust to both affine transform and JPEG compression," IEEE Transactions on Circuits and Systems for Video Technology, 8(13):776-786 Aug. 2003.

Kim, T.Y., et al., "An asymmetric watermarking system with many embedding watermarks corresponding to one detection watermark," IEEE Signal Processing Letters, 3(11):375-377, Mar. 2004.

Kirovski, D., et al., "Multimedia content screening using a dual watermarking and fingerprinting system," Proceedings of the tenth ACM international conference, pp. 372-381, 2002.

Kirovski, D., et al., "Randomizing the replacement attack," ICASSP, pp. 381-384, 2004.

Kirovski, D., et al., "Multimedia content screening using a dual watermarking and fingerprinting system," Multimedia '02 Proceedings of the tenth ACM international conference on Multimedia, 2002 (11 pages).

Kocher, P., et al., "Self-Protecting Digital Content: A Technical Report from the CRI Content Security Research Initiative," Cryptography Research, Inc. (CRI), 2002-2003 (14 pages).

Kutter, M., et al., "The watermark copy attack," Proc. of the SPIE: Security and Watermarking of Multimedia Content II, 3971:1-10, Jan. 2000.

Kuznetsov, A.V., et al., "An error correcting scheme for defective memory," IEEE Trans. Inf. Theory, 6(4):712-718, Nov. 1978 (7 pages).

Lin, E.T., et al., "Detection of image alterations using semi-fragile watermarks," Proceedings of the SPIE International Conference on Security and Watermarking of Multimedia Contents II, Jan. 2000 (12 pages).

Lin, P.L., et al., "Robust transparent image watermarking system with spatial mechanisms," The Journal of Systems and Software, 50:107-116, Feb. 2000.

Lotspeich, J., "The Advanced Access Content System's Use of Digital Watermarking," MCPS '06, Oct. 28, 2006, pp. 19-21.

Lu, C.S., et al., "Oblivious cocktail watermarking by sparse code shrinkage: A regional-and global-based scheme," IEEE Transactions on Multimedia, 4(2):209-224, Dec. 2000.

Maehara, F., et al., "A proposal of multimedial home education terminal system based on flash-squeak OS," Technical report of the institute of image information and television engineers, 28(43):21-24, Jul. 2004.

Mason, A. J., et al., "User requirements for watermarking in broadcast applications," IEEE Conference Publication, International Broadcasting Convention (BC 2000), Amsterdam, Sep. 8-12, 2000 (7 pages).

Mintzer, F., et al., "If one watermark is good, are more better?," Acoustics, Speech, and Signal Processing, ICASSP, 4:2067-2069, Mar. 1999.

Mobasseri, B.G., et al. "Content authentication and tamper detection in digital video," Image Processing Proceedings, International Conference, 1:458-461, 2000.

Moulin, P., et al., "Detection-theoretic analysis of desynchronization attacks in watermarking," Technical Report MSR-TR-2002-24, Microsoft Corporation, Mar. 2002.

Muranoi, R., et al., "Video retrieval method using shotID for copyright protection systems," Proc. SPIE Multimedia Storage and Archiving Systems III, 3527:245-252, Nov. 1998.

Nikolaidis, N., et al., "Watermark detection: benchmarking perspectives," 2002 IEEE Conference on Multimedia and Expo, 2002 (4 pages).

Office Action dated Jul. 21, 2011 for Japanese Patent Application No. 2008-508985 (6 pages).

Office Action dated Mar. 16, 2012 for Japanese Patent Application No. 2008-508985 (8 pages).

Office Action dated Mar. 18, 2011 for European Patent Application No. 03774648.4 (6 pages).

Office Action dated May 8, 2012 for Japanese Patent Application No. 2009-522802 (4 pages).

Office Action dated Nov. 26, 2012 for Japanese Patent Application No. 2011-114667 (8 pages).

Office Action dated Nov. 28, 2012 for Japanese Patent Application No. 2011-114666 (8 pages).

Park, J.H., et al., "Robust and fragile watermarking techniques for documents using bidirectional diagonal profiles," Information and Communications Security: Third International Conference, Xian, China, Nov. 2001, pp. 483-494.

Perez-Gonzalez, F., et al., "Approaching the capacity limit in image watermarking a perspective on coding techniques for data hiding applications," Signal Processing, 6(81):1215-1238 Jun. 2001.

Petitcolas, F., et al., "The blind pattern matching attack on watermark systems," IEEE Trans. Signal Processing, Apr. 2003 (4 pages).

Petitcolas, F.A.P., et al., "Attacks on copyright marking systems," Second Workshop on Information Hiding, Lecture Notes in Computer Science, Portland, Oregon, pp. 218-238, Apr. 1998.

Philips Research Liquid Audio Fraunhofer Institute, "Digital Audio Screening Technology for Phased Rollout," Version 1.00, May 1999 (38 pages).

Pytlak, J.,"Anti-piracy coding," URL: http://www.tele.com/pipermail/tig/2003-November/003842.html; Nov. 2003 (2 pages).

RSA Laboratories, "Frequently asked questions about today's cryptography," Version 4.1, May 2000 (37 pages).

Schneier, B., "Applied cryptography, second edition: protocols, algorithms and source code in C," Oct. 1995 (10 pages).

Shih, F.Y., et al., "Combinational, image watermarking in the spatial and frequency domains," Pattern Recognition, 36:696-975, May 2002.

Solanki, K., et al., "Robust image-adaptive data hiding: modeling, source coding and channel coding", 41st Allerton Conference on Communications, Control and Computing, Oct. 2003 (10 pages).

Steinebach, M., et al., "StirMark benchmark: audio watermarking attacks," International Conference on Information Technology: Coding and Computing (ITCC 2001), Las Vegas, Nevada, Apr. 2001 (6 pages).

Tanaka, K., et al., "Secret transmission method of character data in motion picture communication," SPIE Visual Communications and Image Processing '91, 1605:646-649, 1991.

Tsai, M.J., et al., "Wavelet packet and adaptive spatial transformation of watermark for digital image authentication," IEEE Image Processing, 2000 International Conference, 1:450-453, 2000 (4 pages).

Verance Corporation, "Confirmedia," PowerPoint presentation made to National Association of Broadcasters; Apr. 24, 2001 (40 pages).

Wolfgang, R., et al., "Perceptual watermarks for digital images and video," Proceedings of the IEEE, 87 (7):1108-1126, Jul. 1999.

Yeung, M. M., et al., "An invisible watermarking technique for image verification," Image Processing, International Conference Proceedings, 2:680-683, Oct. 26-29, 1997.

Zhao, J., "A WWW service to embed and prove digital copyright watermarks," Proc. European Conf. on Multimedia Applications, Services and Techniques (ECMAST'96), May 1996 (15 pages).

Zhao, J., "Applying digital watermarking techniques to online multimedia commerce," Proc. Int. Conf. on Imaging Science, Systems and Applications (CISSA'97), Jun./Jul. 1997 (7 pages).

* cited by examiner

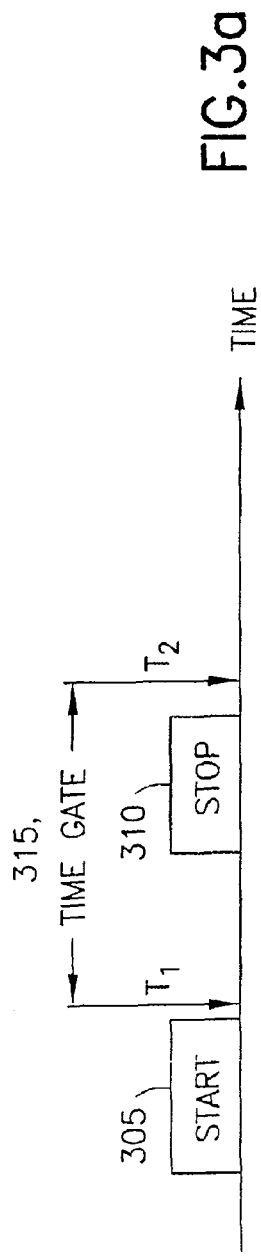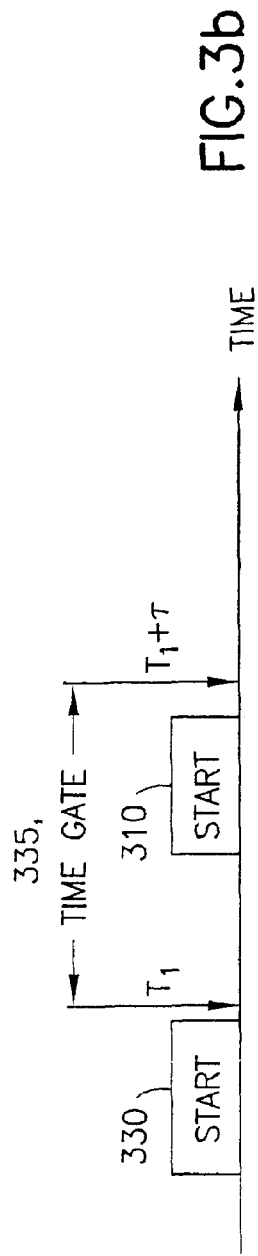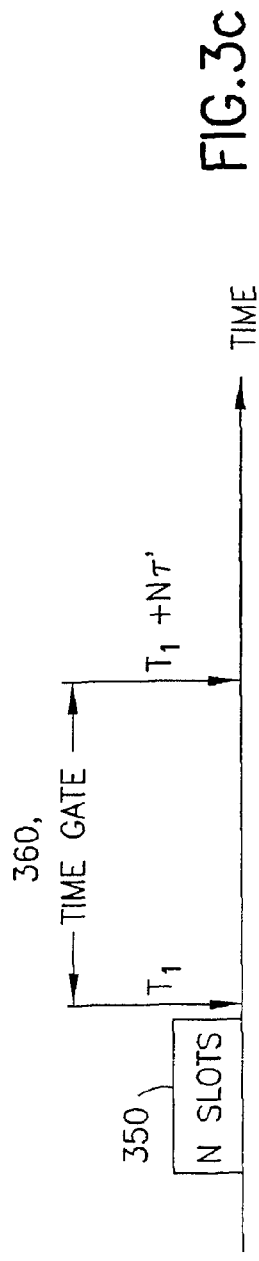

REMOTE CONTROL SIGNALING USING AUDIO WATERMARKS

This application is a continuation of commonly assigned U.S. patent application Ser. No. 12/958,292, filed on Dec. 1, 2010, now U.S. Pat. No. 8,106,745, which is a continuation of U.S. patent application Ser. No. 11/821,203, filed on Jun. 22, 2007, now U.S. Pat. No. 8,106,744, which is a continuation of commonly assigned U.S. patent application Ser. No. 10/794,520 filed on Mar. 5, 2004, now abandoned, which is a divisional of U.S. patent application Ser. No. 09/505,080 filed on Feb. 16, 2000, now U.S. Pat. No. 6,737,957.

BACKGROUND OF THE INVENTION

The present invention relates to a method and apparatus for remotely controlling a device, such as a toy, lock, smart card, or home appliance, via a control message that is imperceptibly embedded In an audio signal, e.g., as a "watermark." Moreover, the invention optionally enables the device to be synchronized with the audio signal, for example, so that the actions of a doll can be synchronized with a children's television program.

Audio signals are ubiquitous, being broadcast over AM/FM radio, TV, public announcement systems, transmitted over telephone channels, or stored on cassette tapes, CDs, computer memories, etc. Therefore, it is convenient to use audio channels or audio storage to transmit or store some other information.

Audio watermarking, or embedded signaling, has recently emerged as a technology for embedding auxiliary data imperceptibly in a host audio signal. A basic feature of audio watermarking techniques is that the embedded signal is substantially imperceptible to a listener of the host signal. Furthermore, the audio-watermarks occupy the same time/frequency/space domain as the host signal, so that they are not lost in standard audio signal processing, recording or transmissions, nor filtering and/or masking operations in a deliberate attack can remove them.

A primary proposed use of watermarking is in protecting intellectual property rights, e.g., through copy control, automatic broadcast monitoring, ownership dispute resolution, Internet commerce tracking, etc. Alternative applications include auxiliary data embedding, such as the song title and purchasing instructions, assurance of content integrity, proof of performance in TV and radio advertisements, audience exposure monitoring, caller identification (authentication) in telephone conversations, or generic covert communication.

Moreover, various schemes have been proposed for sending command and control signals, or their equivalent, concurrently with audio signals. However, these schemes do not qualify as audio watermarking techniques. For example, in one proposed scheme, an "instructional signal" is inserted in a narrow frequency band set aside at the upper frequency edge of the audio spectrum. However, this system does not qualify as a watermarking system since the host and the control signals occupy distinct frequency bands.

In another proposed scheme, a unique code describing an offer for products and services is transmitted by a TV program as an audible "beep". There is no attempt to hide this beep, so this technique also is not audio watermarking.

In yet another proposed scheme, information related to a TV game show is encoded in touch tones and broadcast in-band with an audio portion of the show. The touch-tones can be masked by the show's usual sound effects, such as buzzers and beeps. This is substantially different from the watermarking approach, because it cannot simultaneously meet the inaudibility requirement and the requirement for the time domain overlap of a watermark and an arbitrary audio signal.

Accordingly, it would be desirable to provide a watermarking system for sending command and control signals concurrently with audio signals that overcomes the disadvantages of the existing proposed schemes.

The system should use watermarking techniques to provide a hidden data channel in an audio signal for providing short messages, such as device activation commands, or remote control signals that can change the state of a device.

The system should be compatible with existing watermarking techniques, such as those disclosed in U.S. Pat. No. 5,940,135 to Petrovic at al., entitled "Apparatus and Method for Encoding and Decoding Information in Analog Signals," issued Aug. 17, 1999, and incorporated herein by reference.

The system should provide a hidden remote control signal as a watermark within an audio signal for controlling various devices that detect the hidden signal.

The system should allow the remote control signal to be related to, or independent of, content of the host audio signal. For related content, the system should optionally provide synchronization of the remote control signal with the host audio signal content.

The system should use a watermark to define a time gate (window) during which a device is enabled to receive a user input or perform a specified action.

The system should provide a security mechanism to ensure that the time gate is defined only from a real-time broadcast audio signal, and not from a replay of the audio signal.

The system should improve the robustness and temporal resolution of a watermark, and provide a simplified watermark detector.

The system should provide synchronization of a watermark encoder and decoder.

The present invention provides a system having the above and other advantages.

SUMMARY OF THE INVENTION

The present invention relates to a system for using a watermark embedded in an audio signal to remotely control a device.

In particular, the system is compatible with existing audio-watermarking technologies that use audio channels and/or audio storage to carry independent data without interfering with the audio channel's original purpose. However, such a channel has much lower information capacity than a modem channel, typically no more than about twenty bits per second per audio channel. The invention uses this hidden data channel for relatively short messages, such as device activation commands, or remote control signals that can change state of a device.

A remote control signal is hidden within an audio signal that is broadcast over radio and TV, stored on CDs, DVD, tape or computer memory, played over speakers and/or transmitted over other audio channels. Various devices such as toys, computers, and appliances, that are equipped with an appropriate detector, detect the hidden signal to trigger an action, or change a state of the device. The device action can be completely unrelated to the ongoing audio content, and it can have a number of different objectives, such as entertainment, education, sales, security, etc.

In one particular implementation, a "time gate" device is disclosed, where detection of the watermark opens a time interval within which a user is allowed to perform an action, such as pressing a button, typing in an answer, turning a key in a lock, etc. To prevent fraudulent activation of a time gate, the time gate device can be further upgraded to react only to watermarks coming from live broadcasts, and not from replays from tapes or other storage devices.

In another implementation, detection of the watermark triggers an action.

Additionally, techniques are presented for improving existing watermarking technology in view of requirements for the proposed applications. In particular, the invention provides improvements in robustness of the watermark in the channels with acoustic propagation (e.g., propagation through air)—using delay hopping (watermarking adjacent bits using distinct autocorrelation delays), robustness improvements using redundant watermarking, improvements in the time resolution of the trigger feature, and simplifications of the detector design.

BRIEF DESCRIPTION OF THE DRAWINGS

FIG. 3(a) illustrates a time gate defined by start and stop watermarks in accordance with the present invention.

FIG. 3(b) illustrates a time gate defined by a start watermark and a fixed interval $\tau$ in accordance with the present invention.

FIG. 3(c) illustrates a time gate defined by a start watermark and a multiple N of a fixed interval $\tau$ in accordance with the present invention.

DETAILED DESCRIPTION OF THE INVENTION

The present invention relates to a system for using a watermark embedded in an audio signal to remotely control a device.

Figure 1:
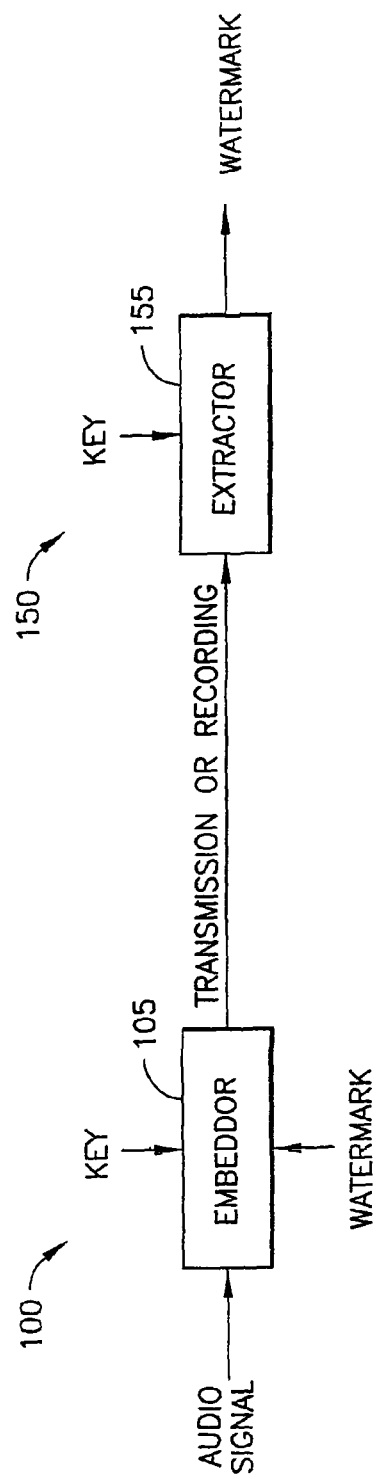
FIG. 1 illustrates an audio watermarking process in accordance with the present invention.

FIG. 1 illustrates an audio watermarking process in accordance with the present invention.

At an encoding side 100, a watermark, i.e., an embedded signal, is inserted into an audio signal at an embeddor 105, using a key, which is a set of parameters that define the hiding process. The key may comprise a steganographic key. The composite signal that is output from the embeddor 105 can be recorded, transmitted over various channels, or processed in different ways, which usually includes corruption by noise and distortion.

The composite signal is received at a decoding side 150, where the embedded signal (watermark) is retrieved from the composite signal in an extractor 155 with the help of the key used in the embedding process.

Various details regarding conventional signal processing techniques, such as compression, coding, error-correction, modulation, and the like, are not explicitly disclosed but their appropriate use will be evident to those skilled in the art.

The embeddor 105 may provide the watermark in the audio signal using various known watermarking techniques, including those discussed in the aforementioned U.S. Pat. No. 5,940,135, where the short-term autocorrelation function of the host audio signal is modulated in such a way to match the embedded signal.

The key contains the information about the frequency band of the host signal used for hiding, the delay set used for autocorrelation calculation and its change patterns, baseband symbol waveform, data packet structure, scrambling key, etc. With this system, the extractor 155 calculates the short-term autocorrelation using the same key, and regenerates the inserted message with the help of standard digital signaling techniques.

Typical bit rates of the embedded messages are low, ranging from a few bits per second to a few tens of bits per second. For example, the International Federation of the Phonograph Industry required 20 bps per channel for its review of watermarking technologies. Those skilled in the art can appreciate that the increase in the bit rate brings reduced robustness, increased audibility and/or increased complexity. Therefore, only relatively short messages can be hidden within an audio signal. This is quite suitable for intellectual property protection, where copy control information and/or content identification codes of less than one-hundred bits are embedded.

However, the present invention proposes the use of audio watermarks for remote control of various devices, such as toys, locks, smart cards, appliances, etc., over standard audio channels, such as radio and TV broadcasts, audio tapes, CDs, telephone channels, public address systems, etc. As an example, we will describe a system for remote control of toys participating in a TV show, as illustrated on FIG. 2.

Figure 2:
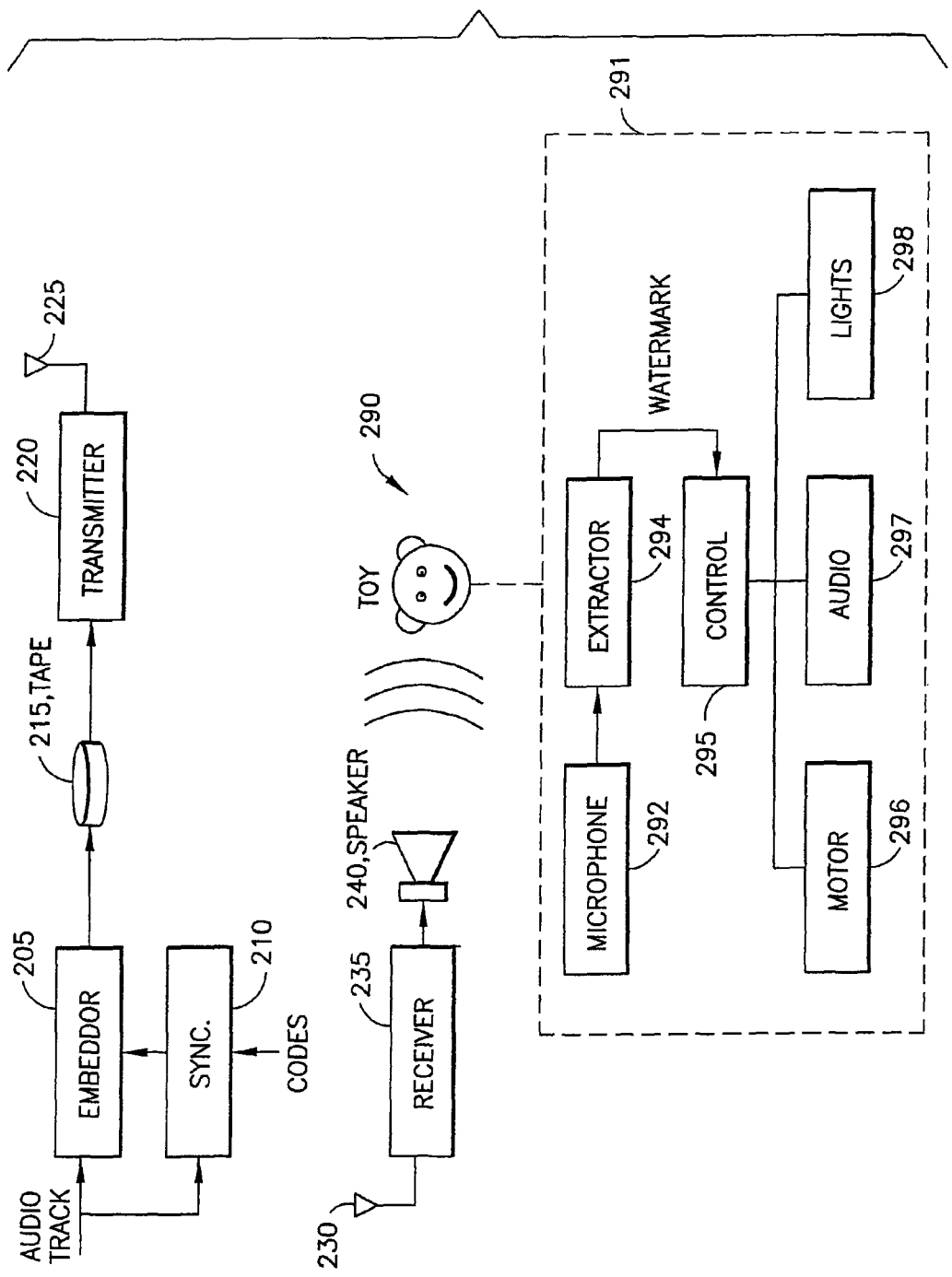
FIG. 2 illustrates a system for remote control of a device, such as a toy, in synchronism with audio data, such as from a television program, in accordance with the present invention.

FIG. 2 illustrates a system for remote control of a device 290, such as a toy, in synchronism with audio data, such as from a children's television program, in accordance with the present invention.

The control messages are inserted using audio watermarking at appropriate places of the show's audio track using an embeddor 205 and a synchronization device 210. The composite audio signal is optionally stored, e.g., on a tape 215, and subsequently broadcast via a transmitter 220 and antenna 225. While antennas 225 and 230 are shown as an illustration, any type of broadcast scheme can be used, including delivery via a terrestrial path, cable, optical fiber, and/or computer network. Moreover, broadcast of the composite signal to a large population of receivers is not required, as the invention is also suitable for any transmission, including point-to-point transmissions, video-on-demand transmissions in a cable television network, and so forth. Moreover, the composite audio signal may be played back locally at a user's home from a storage device such as a tape or disc.

A TV receiver 235 receives the signal via an antenna 230 and the audio signal is played over a TV speaker 240. The toy 290, specially designed in accordance with the present invention, includes components 291, including a built-in microphone 292 for picking up (detecting) the audio signal, a watermark extractor 294 for extracting the watermarks from the composite audio signal, and a control 295 that is responsive to the watermarks for performing some action.

The toy 290 may optionally be hard-wired to the receiver using appropriate jacks and wiring, in which case the microphone 292 is not needed.

A motor 296, audio function 297, such as a speech synthesizer, and lights function 298 are responsive to the control 295. For example, if the toy 290 is a doll, the audio function 297 may play a prerecorded message in concert with the ongoing show. The motor 296 may cause the toy's 290 arms, legs, head and/or mouth to move. The lights function 298 may cause the toy's eyes to light up. This creates the appealing impression that the toy is actually following the show together with the children, and that it participates.

Advantageously, no modification is required for the TV channel, including the TV signal storage equipment, satellite distribution channels, broadcast equipment, and TV sets. Additional equipment consists only of an embeddor, specially designed for precise watermark insertion at a desired segment of the audio track, and a mass-produced, inexpensive detector incorporated in a suitably-designed toy and connected to the toy controller 295. Also, note that the same toy 290 can be activated by audio watermarks coming from any audio source, such as an AM/FM radio broadcast, CD or tape player, or speakers wired to a computer.

An important feature in the previous example is the synchronization of the action of a toy (or toys) with the ongoing show. To achieve this, the watermark should be embedded in the audio track segment immediately preceding the desired moment of the toy action, with a small allowance for processing and propagation delays. This synchronizing feature can be useful in many other practical applications.

Time Gate

For example, we will describe here a device suitable for watermark-based activation that we will call a "time gate" (e.g., window). In accordance with the invention, the detection of a watermark causes the time gate to open a time interval, during which a user is allowed to perform an action.

For example, during an interactive TV quiz show, the viewers may participate by keying in their answers to a hand-held unit, while the players in the television studio prepare their answers. This can be achieved if the audio track has appropriately inserted watermarks, and if a time gate device synchronized to the watermarks controls access to the hand-held unit.

Such a hand-held unit can have similar componentry as the toy 290 of FIG. 2. The control 295 can be configured to send a message to the user to alert the user that the time gate has started or ended, the duration of the time gate, and the amount of time remaining in the time gate. An output screen on the hand-held unit, such as a liquid-crystal display (LCD), may be appropriate for this purpose. Or, the hand-held unit may send a signal back to the television receiver 235 to provide a display on a TV or computer screen that informs the user of the information provided by the watermark (e.g., via a wired path, infra-red signal or the like).

Alternative applications including an automated audio/video exam, where the time gate defines a period during which the user can enter responses for the exam, alertness monitoring, where the user is required to provide an input during the time gate, TV coupon collection, where electronic coupons can be retrieved by a user during the time gate, remote control of a lock, where the lock can be opened or closed only during the time gate, and so forth, are discussed below.

Three different designs of the time gate protocol are illustrated in FIGS. 3(*a*)-3(*c*).

FIG. 3(*a*) illustrates a time gate defined by start and stop watermarks in accordance with the present invention.

This design uses two distinct watermarks, including a start watermark 305 and a stop watermark 310, to mark the desired beginning and the end, respectively, of the gated interval 315 bounded by $T_1$ and $T_2$. Note that the boundaries of the interval 315 are shown as occurring slightly after the end of the corresponding watermarks, due to processing and propagation delays. This design can mark an arbitrary time interval that is larger than the duration of the stop watermark 310, since the duration of the stop watermark 310 consumes a portion of the time gate 315.

FIG. 3(*b*) illustrates a time gate defined by a start watermark and a fixed interval τ in accordance with the present invention.

This time gate protocol design is simpler than that of FIG. 3(*a*) since it requires a single start watermark 330 before the beginning of the marked interval 335. The duration of the marked interval-(time gate), τ, is predefined, e.g., at the time the device, such as the toy 290 in FIG. 2, is manufactured. However, the interval may be re-programmable (e.g., by replacing a memory chip). This design is suitable if the user action is simple, like pressing a button, or turning a key in a lock.

FIG. 3(*c*) illustrates a time gate defined by a start watermark and a multiple N of a fixed interval τ' in accordance with the present invention.

This time gate design requires a single watermark 350, but still can mark a variable time interval. This is achieved by inserting an integer number N into the watermark's data field, where the interval 360 is N times a predefined time slot duration τ'.

The value N can be carried in a separate or same watermark as that of the control data, or even provided beforehand. A preferred solution is for the same watermark 350 to include both N and the control data (for reasons of efficiency, potential for false action, etc.)

Figure 4:
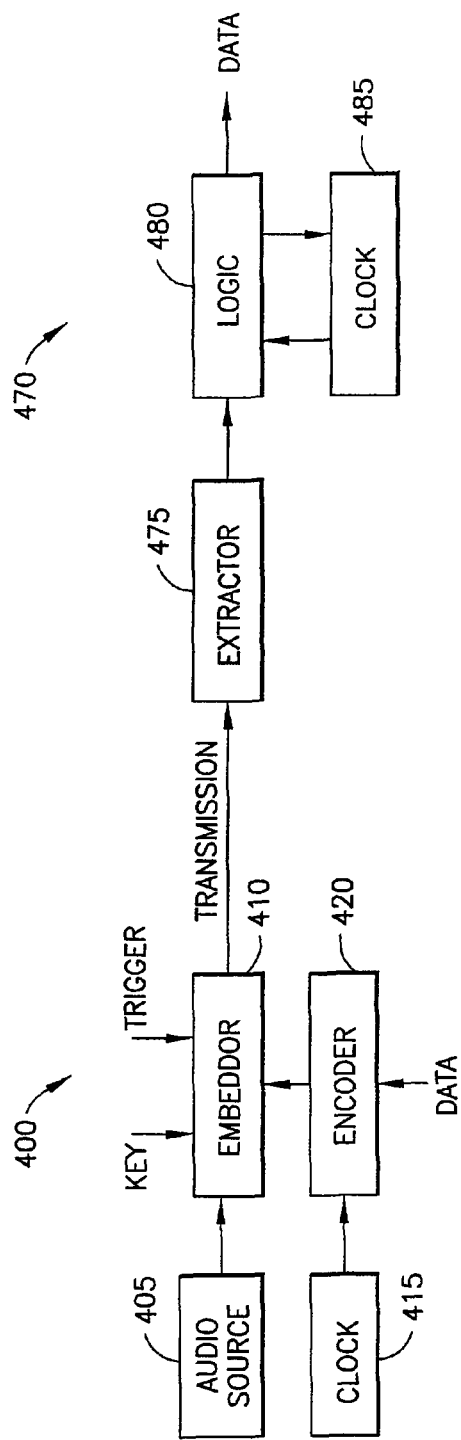
FIG. 4 illustrates a real-time time gate application in accordance with the present invention.

FIG. 4 illustrates a real-time time gate application in accordance with the present invention.

Many time gate applications allow pre-processing of the audio track in a similar manner as depicted in FIG. 1, e.g., for toy applications. For example, the time gate device can be used in an educational process to monitor alertness of the student. In this case, a pre-recorded lecture (video/audio, or audio only) contains a watermarked content that opens a time gate interval after questions/instructions that require the student's response, such as pressing yes/no buttons on the time gate device. The device may score correct/incorrect answers for review by a teacher, but we expect major educational benefits by simply confirming that the student was paying attention to the audio signal.

Similarly, an advertisement company may poll viewers about an advertised product, and engage their attention. Active participation of users is expected to bring better recognition of products in a shorter time, and lower advertisement costs. In particular, as an encouragement for participation, an advertiser may offer discounts to those who bring the time gate device to a specified retail store, where the user's answers to the poll questions are downloading from the device. This is equivalent to bringing cut-out coupons from a paper advertisement. Again, the watermarks are pre-stored in the audio track of a TV or radio adds.

However, in other applications, the embedding of the watermark should occur in real-time, while the audio signal is being transmitted. Such a case occurs when the time gate is used, for instance, to control a user's access to a secure area or safe box, or to override other restrictions. For example, an innocuous public address system announcement or background music may be used with an electronic lock to allow a key to operate within the defined time interval. Similarly, a user may remotely control a door lock in the user's residence by calling home over a telephone line, and speaking to the telephone answering machine (with its speaker on). The user's telephone set includes an encoder that embeds watermarks with control data into the user's voice. When the voice is received at a decoder with a watermark extractor at an electronic door lock mechanism, the lock can be activated.

In a related example, background music or a public address announcement in a larger facility such as an office may be used as a host audio signal for watermarked control data to remotely lock or unlock doors, filing cabinets and so forth without requiring re-wiring of the facility.

With these applications, it is important that there is no detectable communication channel between the user and the controlled device, so that potential attackers are oblivious to the control mechanism. Furthermore, if an attacker does learn the operational principle of the lock, he/she should not be able to gain access to the secure area by recording and subsequently replaying the audio signal with the embedded control data.

Even if an attacker knows the operational principle of the lock, he/she cannot forge the message if he/she does not know the secret key used in the embedding process, as shown in FIG. 1.

The real-time time gate system shown in FIG. 4 addresses these concerns. An encoding side 400 includes an audio source 405, an embeddor 410, a clock 415 and a control data encoder 420. A receiving side 470 that receives the real-time transmission of the composite audio signal includes an extractor 475, a logic function 480, and a clock 485.

The embeddor 410 receives a continuous audio signal from the audio source 405, and also receives a string of messages from the data encoder 420. The messages include the control data, as well as timing information from the local clock 415, with possibly some additional data (e.g., number of slots for slotted time gate). The message embedding is triggered from outside, e.g., by an operator pressing a button on the embeddor 410. The message is inserted into the audio data stream using a secret key. In the real-time operation, the message is immediately transmitted, i.e., there is no recording of the audio signal except for a short buffering in the embeddor 410 necessary for the embedding process (up to a few tens of milliseconds). The output composite signal is transmitted over a standard audio channel (telephone, radio, TV, public announcement system, etc). The receiver 470 detects the signal and passes it to the extractor 475, which detects the message and passes it to the logic function 480 for verification.

The logic function 480 compares the timing data from the incoming message to locally-generated timing data from the clock 485. If the match is sufficiently close, the logic function 480 concludes that a real-time transmission has occurred, and the control information taken from the received message is passed, e.g., starting the time gate. Simultaneously, the local clock 485 may be adjusted (e.g., synchronized with the clock 415) if the discrepancy with the transmitter clock 415 is within predefined bounds. However, if the time discrepancy is too large (e.g., the local time is significantly after the transmitted time), it implies that recording and play back may be taking place, so the message is ignored.

If the local time is significantly before the transmitted time, this implies a significant mis-calibration, and a default mode can be invoked to ignore the message.

Clearly, potential attacks based on storing and replaying messages would introduce large delays, certainly more than a few seconds. On the other hand, propagation and processing delays are certainly less than a second, so there should be a clear separation of the two cases. Also, typical clock devices can maintain a timing error well below a couple of seconds for a quite long time, so that the time drift of local clocks can be also distinguished from the store-and-replay attack. Occasional re-synchronization of the receiver clock with the transmitter's clock should keep the timing mismatch between the send and receive clocks within tight bounds indefinitely. This re-synchronization can be achieved using known techniques.

Watermark Design Considerations

The applications described above impose somewhat different sets of requirements on the audio watermark design than do the intellectual property protection applications. For example, most of the applications described above imply an acoustic (free-space) propagation channel, while the property rights establishment is usually done on an electronic form of the audio signal. The use of an acoustic propagation channel is especially challenging since it generates intersymbol interference due to multipath, signals may be corrupted with background noise, and the distortions in speakers and microphones are usually large compared to electronic channel distortions.

Furthermore, some of the above applications, such as the toy applications, require very inexpensive designs for the watermark extractors. On the other hand, in some other applications, such as remote control of locks, it is equally important to have an inexpensive embeddor as well, e.g., for the telephone set example. Finally, the time gate device requires careful consideration of timing tolerances to achieve the best possible resolution in time domain, as opposed to typical copyright protection applications, where the location of the watermark within a signal is relatively unimportant.

With the above requirements in mind, the present inventors looked at different watermarking technologies, and found that the best-suited technology is the autocorrelation modulation (ACM) technique described in the aforementioned U.S. Pat. No. 5,940,135. However, any other suitable watermarking/data embedding technique may be used.

ACM features a simple design for the embeddor and extractor, high robustness, large throughput, low probability of falses, good layering capability, and full inaudibility. However, the present invention provides improvements and the special selection of design parameters to optimize ACM for the proposed applications. Herein, several techniques are disclosed that can substantially improve the performance of ACM in remote control signaling using audio watermarks.

The acoustic-coupling environment, where a speaker broadcasts an audio signal, and the detector captures it through a microphone, can be improved by a special watermark design that is not addressed by conventional techniques. The main issue is, the multipath propagation caused by reflections of acoustic waves, which may introduce intersymbol interference to the watermark detector. Standard techniques to fight intersymbol interference, such as adaptive equalization, are too costly for an inexpensive detector. An increase in the bit interval is helpful, but with obvious drawback in the reduction of the watermark bit rate.

To avoid intersymbol interference, we propose watermarking adjacent bits using distinct autocorrelation delays ("delay hopping"). In effect, distinct autocorrelation delays can be considered as distinct channels, with little interference between them. This aspect of the invention increases the watermark robustness, which is particularly useful in the acoustic-coupling environment, but may be used in other environments as well. That is, if consecutive symbols are sent over distinct channels, they cannot cause intersymbol interference, regardless of the pulse broadening caused by a multipath environment.

In a further aspect of the invention, robustness of the watermarking is improved by first evaluating the masking ability of the host audio signal before embedding the watermark. In a typical scenario, the device activation, time gate opening, or other actions occur upon detection of the corresponding watermark. This means that the encoder should insert the watermark immediately prior to the desired moment, taking into account propagation and processing delays. However, the desired (candidate) watermark insertion interval may be unsuitable, for example, if it is mainly a silence. Accordingly, the watermark can be inserted before the desired instant of action, along with information for informing the decoder about the delay between the watermark detection and the desired action, which corresponds to the delay between the time segment in which the watermark is embedded and the original desired time segment.

There is a tradeoff between the flexibility in choosing the optimum watermark insertion time and the amount of the payload (bits) assigned to the delay information.

Figure 5:
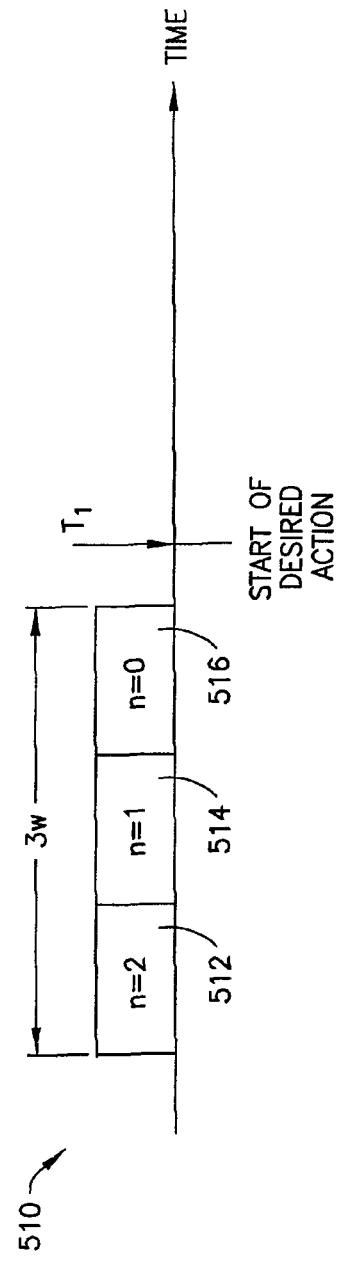
FIG. 5 illustrates the use of countdown watermarks for defining a start time of a desired action in accordance with the present invention.

FIG. 5 illustrates the use of countdown watermarks for defining a start time of a desired action in accordance with the present invention.

In a further alternative embodiment, a string of watermarks 510 is embedded before the desired start of action ($T_1$). Each watermark, such as watermarks 512, 514 and 516, has a countdown data field (n=2, 1, 0) that indicates the number of remaining watermarks before ($T_1$). Detection of any of the watermarks in the string 510 allows the calculation of the desired timing of the action. For example, if the countdown field of a particular watermark contains the countdown field value n, and the watermark duration is w seconds, than the desired action should begin n*w seconds after the particular watermark is detected, plus some additional propagation and processing delay.

This provides improved robustness since the start time of the desired action is designated with redundance. Thus, even if all but one of the watermarks are not received correctly, the start time will be still be designated.

Figure 6:
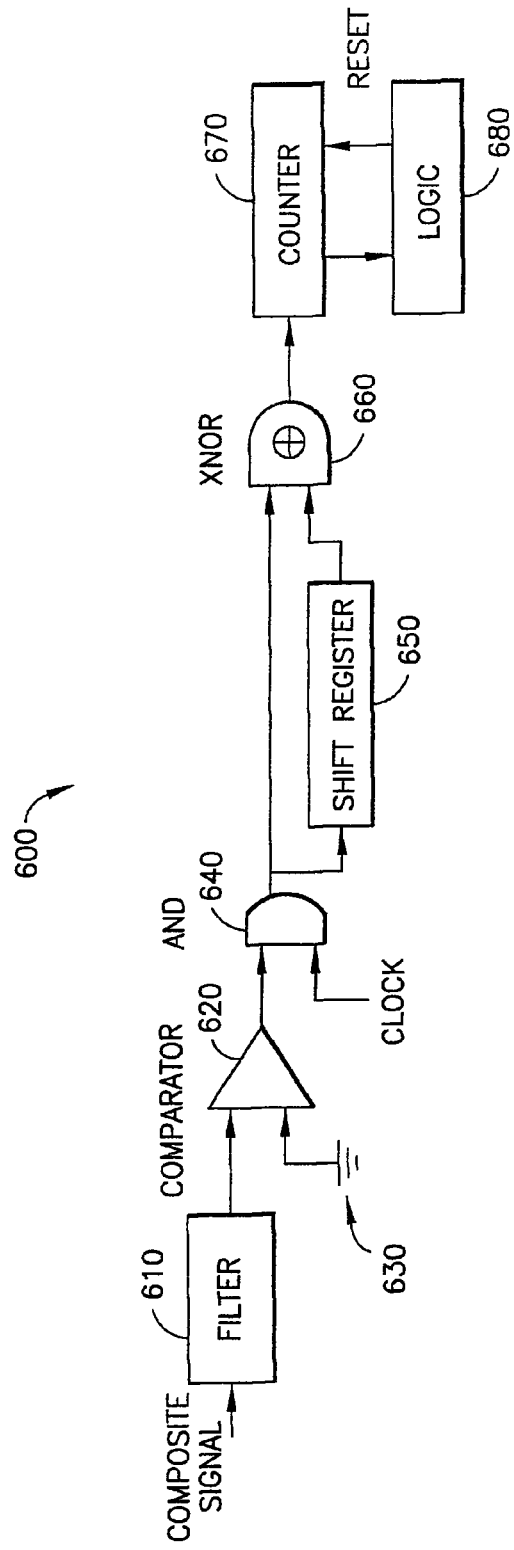
FIG. 6 illustrates an autocorrelation modulation extractor based on sign correlation in accordance with the present invention.

FIG. 6 illustrates an autocorrelation modulation extractor based on sign correlation in accordance with the present invention.

The simple decoder design described in the aforementioned U.S. Pat. No. 5,940,135 includes a filter, followed by a delay line, correlator (multiplier), and an integrator. The output of the integrator represents a base-band watermark signal without normalization. When a binary message has been embedded, the output is positive at the decision moment if a "one" bit is embedded, or negative for a "zero" bit. In this design, it is important to maintain a very precise delay in the delay line; small errors in the delay can bring significant distortion of the watermark signal. Those skilled in the art know that precise delays are best achieved by a digital delay line. This means that an A/D converter is necessary prior to the delay line, which add to the cost of the decoder.

In accordance with the present invention, the decoder of U.S. Pat. No. 5,940,135 can be further simplified as shown in FIG. 6 to meet even lower cost demands, suitable for toy applications, without compromising the delay precision.

This decoder 600 includes a filter 610 that receives the composite signal with the watermark, e.g., from a channel or a storage device, and a comparator 620 for comparing the filtered signal to ground 630. An AND gate 640 receives the output of the comparator 620, and a local clock signal. An XNOR (exclusive-NOR) gate 660 receives a direct output of the AND gate 640, as well as a shifted version of the output via shift register 650. The output of the XNOR gate 660 is provided to a counter 670, which communicates with a logic function 680.

Thus, instead of multiplying the received signal with a delayed version of itself, it is possible to detect the signal polarity, and then perform an XNOR operation between the signal and a delayed version of itself (i.e., if the signs are the same, the output is one, if opposite, the output is zero). Then, instead of integration, it is enough to run the counter 670 at a clock rate that is much higher than the bit rate for the duration of the watermark bit. If the count at the end of the bit interval is more than half the maximum count, then a "one" bit is detected; otherwise a "zero" bit is detected. A synchronizing algorithm, residing in the logic block 680, determines the beginning and the end of the bit interval, and generates a reset signal for the counter at the end of each bit.

The above simplification shows that the comparator substitutes for an A/D converter, the XNOR gate 660 replaces a multiplicator, and the counter 670 substitutes for an integrator. Moreover, the present inventors have confirmed through experimentation that the proposed simplification does not significantly reduce robustness.

Figure 7:
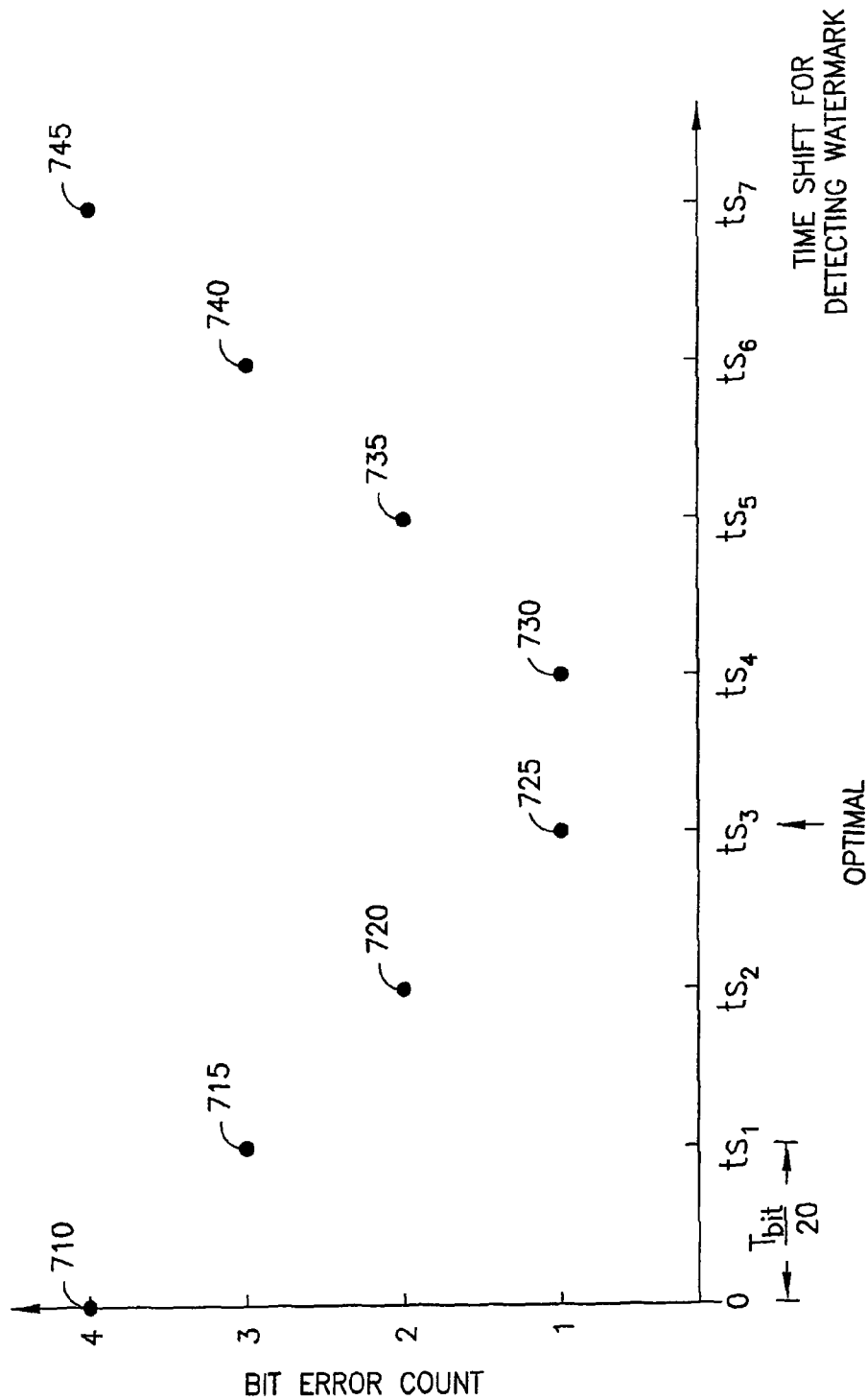
FIG. 7 illustrates an example of a bit error count versus a time shift for detecting a watermark in accordance with the present invention.

FIG. 7 illustrates an example of a bit error count versus a time shift for detecting a watermark in accordance with the present invention.

In the time gate applications in particular, but in other triggering applications as well, it is important to achieve a good timing precision in detecting the end of a watermark. In the case of watermarks described in U.S. Pat. No. 5,940,135, this is equivalent to detecting the trailing edge of the last bit of the watermark bit stream. However, noise and channel distortions can corrupt the trailing edge of any bit, or the bit as a whole. Therefore, it is necessary to take the watermark in its totality to decide the most probable timing of the end of the watermark.

In typical digital watermarks described in U.S. Pat. No. 5,940,135, error correction codes are used to recover watermarks in the case when some bits are corrupted. In this case, the watermark can be detected at a time interval that is slightly earlier than its optimal position, but with a higher error count than in its optimal position. The present invention modifies this scheme propose to use this feature to further optimize the watermark timing detection.

In accordance with the present invention, the decoder will attempt to detect the watermark with a starting and ending position that are delayed slightly with respect to the timing position where initial detection of the watermark occurred. The time shifts are very small with respect to the watermark duration, typically of the order of 5% of the bit interval ($T_{bit}$) (each watermark contains tens or even hundreds of bits). In each of these shifts, the decoder will continue to detect the same watermark and monitor the bit error count over the duration of the watermark. The same watermark is detectable even with slight time shifts, which is the basis of the precise time resolution disclosed herein. The optimum timing is found where the error count is minimized. For multiple minimums, the optimum timing can be taken at the midpoint.

For example, in FIG. 7, the error count changes as the detecting time is shifted. Initially, with no time shift (i.e., at the originally-detected position), the watermark is detected with four bits in error (point 710). However, as the detecting time is shifted in steps of ts (e.g., ts=$T_{bit}$/20) the error count decreases (points 715 and 720), reaches a minimum for two shifts (points 725 and 730), and then increases (points 735, 740 and 745).

A minimum bit error (points 725 and 730) is reached for two consecutive steps, and we conclude that the best estimate for a reference position of the watermark (which can be, e.g., the ending time of the watermark) is at the mid-point of these two events, i.e., at ($ts_3+ts_4$)/2. Alternatively, either $ts_3$ or $ts_4$ could be selected. The resolution of the extractor's clock will govern the minimum possible time shift.

If only one minimum is found, the optimum position is taken at that time shift position.

To reduce computations, it is possible to terminate the bit error calculations once a minimum has been detected and the bit error count begins to rise (e.g., at point 735). Also, optionally, the bit error calculations can be terminated when a bit error count of zero is first reached.

As an numeric example, assume the watermark message is two seconds long, and $T_{bit}=0.08$ sec. Let us say that watermark is first detected in the audio signal starting at time 12.340 sec. and ending at time 14.340 sec. This corresponds to a zero time shift. Then, with ts1=0.08/20=0.004 sec., the watermark is next detected starting at time 12.344 sec., and ending at time 14.344 sec., and so forth. Note that the detection interval is 2 sec., and the position shift, and the resolution, is 0.004 sec.

Moreover, for a strong watermark, the error count may reach zero or some other minimum value for several time shifts. In this case, the optimum timing is again set in the middle of the time intervals with the minimum errors.

Experiments show that this technique detects the watermark with the precision of +/−20% of the bit interval. For example, for watermarks running at a 50 bit/sec. rate, this corresponds to a time resolution of +/−4 ms. This resolution corresponds to +/−1.4 meters of acoustic propagation delay, so it is adequate for the systems based on acoustic coupling.

Accordingly, it can be seen that the present invention provides a method and apparatus with various advantages, including:
- allows remote control of a device, such as a toy, lock, smart card, or home appliance, via a control message that is imperceptibly embedded in an audio signal as a watermark;
- is compatible with, and builds upon, existing watermarking techniques;
- allows the remote control signal to be synchronized with the audio content, such as to allow a toy to move in conjunction with the audio track of a children's television program;
- uses a watermark to define a time gate (window) during which a device is enabled to receive a user input;
- provides a security mechanism to ensure that the time gate is defined only from a real-time broadcast audio signal, and not from a replay of the audio signal;
- provides a simplified watermark detector;
- improves the robustness and temporal resolution of a watermark, e.g., in acoustic propagation channels, by shifting the detecting point based on an error count of the watermark; and
- improves robustness by evaluating the masking ability of the host audio signal when embedding the watermark, and inserting the watermark in a suitable interval before the desired action, along with information indicating the time shift, if necessary.

Although the invention has been described in connection with various specific embodiments, those skilled in the art will appreciate that numerous adaptations and modifications may be made thereto without departing from the spirit and scope of the invention as set forth in the claims.

What is claimed is:

1. A method, comprising:
    receiving, at a first device, an acoustically propagated audio content transmitted by a speaker device, wherein the acoustically propagated audio content corresponds to a user voice command and includes one or more substantially inaudible watermarks that are embedded therein, and wherein the one or more substantially inaudible watermarks include designed characteristics that improve watermark robustness against impairments due to acoustic propagation of the audio content;
    recovering, at the first device, at least one embedded watermark from the received audio content; and
    triggering an operation of the first device based at least in-part on the recovered watermark(s).

2. The method of claim 1, wherein the operation comprises controlling an electronic interface associated with the first device.

3. The method of claim 1, wherein the operation comprises overriding an access restriction.

4. The method of claim 1, wherein the operation comprises unlocking the first device.

5. The method of claim 1, wherein the operation comprises:
    presenting an interactive opportunity to a user of the first device; and
    receiving one or more inputs from the user in response to the presentation of the interactive opportunity.

6. The method of claim 5, wherein the one or more inputs is received pursuant to a user action selected from the group of user actions consisting of:
    providing an answer to a quiz;
    pressing a button; and
    typing a text.

7. The method of claim 5, wherein a sales transaction is facilitated in accordance with the one or more user inputs.

8. The method of claim 1, wherein the operation comprises displaying information on a display screen.

9. The method of claim 8, wherein:
    the display screen is located remotely from the first device; and
    the first device transmits the information to the display screen.

10. The method of claim 1, wherein the operation comprises playing another audio content.

11. The method of claim 1, wherein the operation comprises changing a state of the first device.

12. The method of claim 1, wherein the first device is selected from a group of devices consisting of:
    a computer;
    a handheld device;
    a toy;
    an appliance; and
    a smart card.

13. The method of claim 1, wherein the recovered watermark(s) convey a time for triggering the operation.

14. The method of claim 1, wherein the acoustically propagated audio content is generated, at least in-part, by:
    receiving a user's spoken word(s) at a second device;
    embedding, in real-time, the one or more substantially inaudible watermarks into the user's spoken word(s); and
    transmitting the audio content comprising the user's spoken word(s) that include the one or more substantially inaudible watermarks.

15. The method of claim 14, wherein transmitting the audio content comprising the user's spoken word(s) comprises playing the user's spoken word(s) that include the one or more substantially inaudible watermarks on the speaker device.

16. The method of claim 1, wherein the audio content is stored on a storage medium prior to being acoustically propagated to the first device.

17. A device, comprising:
    a receiver configured to receive an acoustically propagated audio content transmitted by a speaker device, wherein the acoustically propagated audio content corresponds to a user voice command and includes one or more substantially inaudible watermarks embedded therein, and wherein the one or more substantially inaudible watermarks include designed characteristics that improve watermark robustness against impairments due to acoustic propagation of the audio content;

an extractor configured to recover at least one embedded watermark from the acoustically propagated user voice command audio content;

a control module configured to trigger an operation of the device based at least in-part on the recovered watermark (s).

18. The device of claim 17, wherein the operation comprises controlling an electronic interface associated with the first device.

19. The device of claim 17, wherein the operation comprises overriding an access restriction.

20. The device of claim 17, wherein the operation comprises unlocking the device.

21. The device of claim 17, wherein the operation comprises:
   presenting an interactive opportunity to a user of the device; and
   receiving one or more inputs from the user in response to the presentation of the interactive opportunity.

22. The device of claim 21, wherein the one or more inputs is received pursuant to a user action selected from the group of user actions consisting of:
   providing an answer to a quiz;
   pressing a button; and
   typing a text.

23. The device of claim 21, wherein a sales transaction is facilitated in accordance with the one or more user inputs.

24. The device of claim 17, wherein the operation comprises displaying information on a display screen.

25. The device of claim 24, wherein:
   the display screen is located remotely from the device; and
   the device transmits the information to the display screen.

26. The device of claim 17, wherein the operation comprises playing another audio content.

27. The device of claim 17, wherein the operation comprises changing a state of the device.

28. The device of claim 17, wherein the device is selected from a group of devices consisting of:
   a computer;
   a handheld device;
   a toy;
   an appliance; and
   a smart card.

29. The device of claim 17, wherein the recovered watermark(s) convey a time for triggering the operation.

30. A non-transitory storage medium with an audio content stored thereupon, the stored audio content corresponding to a user voice command and comprising:
   one or more substantially inaudible watermarks that are embedded in the audio content, wherein the one or more substantially inaudible watermarks include designed characteristics that improve watermark robustness against impairments due to acoustic propagation of the audio content and wherein upon reception of the audio content that has been acoustically propagated to a device equipped with a watermark extractor, the device is triggered to:
   recover at least one embedded watermark from the acoustically propagated audio content; and
   trigger an operation of the device based at least in-part on the recovered watermark(s).

\* \* \* \* \*

UNITED STATES PATENT AND TRADEMARK OFFICE
CERTIFICATE OF CORRECTION

PATENT NO. : 8,451,086 B2
APPLICATION NO. : 13/361260
DATED : May 28, 2013
INVENTOR(S) : Rade Petrovic et al.

It is certified that error appears in the above-identified patent and that said Letters Patent is hereby corrected as shown below:

ON THE TITLE PAGE

On Page 5, in Item (56), under "OTHER PUBLICATIONS", in Column 1, Line 1, please delete "al," and insert -- al., --, therefor.

On Page 5, in Item (56), under "OTHER PUBLICATIONS", in Column 1, Line 4, please delete "al," and insert -- al., --, therefor.

IN THE SPECIFICATION

In Column 3, Line 31, please delete "$\tau$" and insert -- $\tau'$ --, therefor.

In Column 6, Line 29, please delete "etc.)" and insert -- etc.). --, therefor.

In Column 6, Line 54, please delete "adds." and insert -- ads. --, therefor.

In Column 8, Line 45, please delete "issue is," and insert -- issue is --, therefor.

In Column 9, Line 33, please delete "be still be" and insert -- be still --, therefor.

In Column 10, Line 55, please delete "ts=$T_{bit}$/20)" and insert -- ts=$T_{bit}$/20), --, therefor.

In Column 11, Line 6, please delete "As an" and insert -- As a --, therefor.

In Column 11, Line 10, please delete "ts1" and insert -- $ts_1$ --, therefor.

Signed and Sealed this
Twenty-fourth Day of December, 2013

Margaret A. Focarino
*Commissioner for Patents of the United States Patent and Trademark Office*

CERTIFICATE OF CORRECTION (continued)
U.S. Pat. No. 8,451,086 B2

IN THE CLAIMS

In Column 13, Lines 8-9, in Claim 17, please delete "propagated user voice command" and insert -- propagated --, therefor.